(12) United States Patent
Enoki et al.

(10) Patent No.: US 8,495,041 B2
(45) Date of Patent: Jul. 23, 2013

(54) DATA STRUCTURE, COMPUTER SYSTEM, METHOD AND COMPUTER PROGRAM FOR SEARCHING DATABASE

(75) Inventors: Miki Enoki, Kanagawa-ken (JP); Kiyokuni Kawachiya, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/708,588

(22) Filed: Feb. 19, 2010

(65) Prior Publication Data
US 2010/0217995 A1    Aug. 26, 2010

(30) Foreign Application Priority Data

Feb. 23, 2009 (JP) .................................. 2009-39918

(51) Int. Cl.
*G06F 7/00* (2006.01)
*G06F 17/00* (2006.01)

(52) U.S. Cl.
USPC .......................................... 707/700; 707/703

(58) Field of Classification Search
USPC .................... 707/700, 703, 999.201, 999.203
See application file for complete search history.

(56) References Cited

U.S. PATENT DOCUMENTS

| | | | | |
|---|---|---|---|---|
| 5,278,979 A | * | 1/1994 | Foster et al. ........................... | 1/1 |
| 5,799,322 A | * | 8/1998 | Mosher, Jr. ............................ | 1/1 |
| 5,864,849 A | * | 1/1999 | Bohannon et al. ............ | 707/648 |
| 5,999,924 A | * | 12/1999 | Bair et al. ...................... | 707/700 |
| 6,125,371 A | * | 9/2000 | Bohannon et al. ............. | 707/695 |
| 7,461,159 B2 | * | 12/2008 | Tayyar et al. .................. | 709/229 |
| 7,912,844 B2 | * | 3/2011 | Boyle et al. .................... | 707/754 |
| 7,979,401 B2 | * | 7/2011 | Beglin et al. ................... | 707/674 |
| 8,121,973 B2 | * | 2/2012 | Anderson et al. ............... | 706/62 |
| 2007/0050429 A1 | * | 3/2007 | Goldring et al. .............. | 707/203 |
| 2008/0140629 A1 | * | 6/2008 | Porter ............................... | 707/3 |

FOREIGN PATENT DOCUMENTS

| JP | 10301824 A | 11/1998 |
|---|---|---|
| JP | 2002014984 A | 1/2002 |
| JP | PUPA 2006-511876 | 4/2006 |

OTHER PUBLICATIONS

Jensen et al, "Transaction Timestamping in (Temporal) Databases", 2001, Proceedings of the 27th VLDB Conference, pp. 441-450.*
Lin et al, "Enchancing External Consistency in Real-Time Transactions", Mar. 1996, SIGMOD Record, vol. 25 No. 1.*

* cited by examiner

*Primary Examiner* — Brannon W Smith
(74) *Attorney, Agent, or Firm* — Cantor Colburn LLP; Dwayne Nelson

(57) ABSTRACT

A database system that issues a reference transaction by designating a time stamp. Data structures are provided for making an inquiry about the latest value at a designated time using a database in which values and information on times associated with the individual values are contained in a table. One of the data structures includes, for each of IDs associated with the values in the database, at least one time stamp that is sorted in chronological order (hereinafter referred to as a first time stamp); values belonging to the individual first time stamps; and a pointer that designates one of the first time stamps, the first time stamps indicating the times when the values become valid. The other of the data structures includes, for each of the IDs, the designated first time stamp and a value belonging to the designated first time stamp.

16 Claims, 17 Drawing Sheets

FIG. 1

|  ID  |     TIME STAMP      | VALUE |
|------|---------------------|-------|
|  11  | 2006-01-01 10:00:00 |  500  |
|  11  | 2006-01-12 12:00:00 | 1700  |
|  22  | 2006-01-01 10:00:00 |  600  |

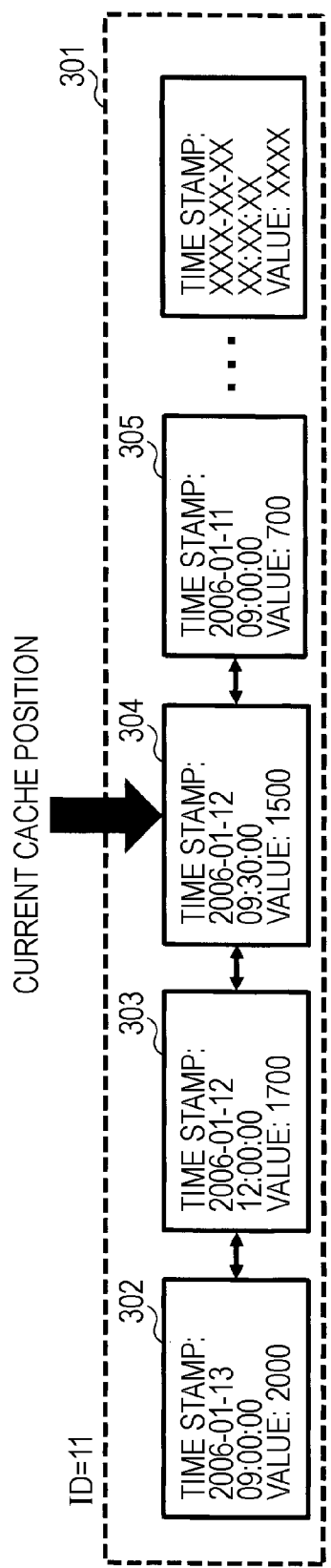

| ID | TIME STAMP | VALUE |
|---|---|---|
| 11 | 2006-01-12 09:30:00 | 1500 |
| 22 | 2006-01-11 00:00:00 | 800 |
| 33 | 2006-01-11 10:00:00 | 1000 |

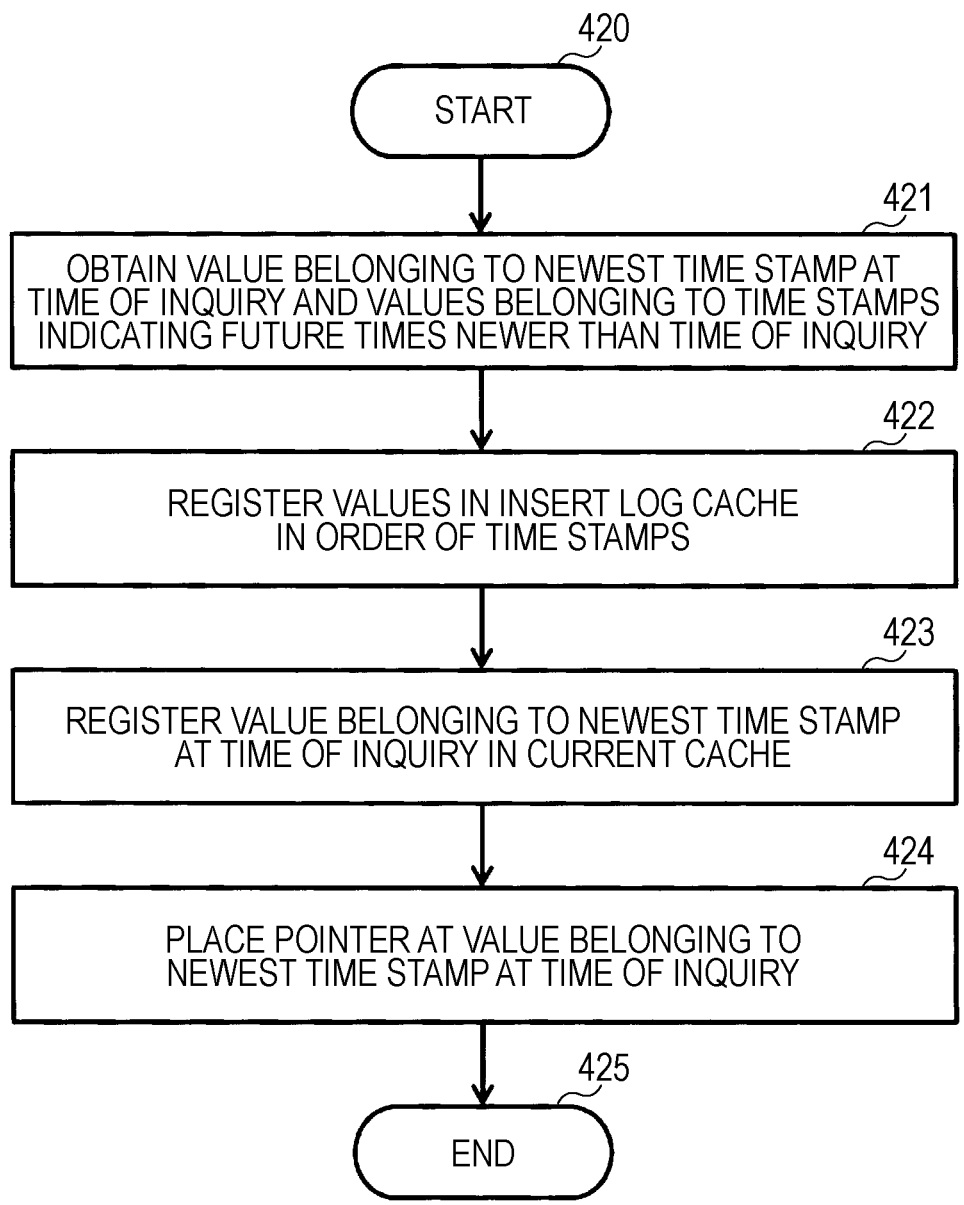

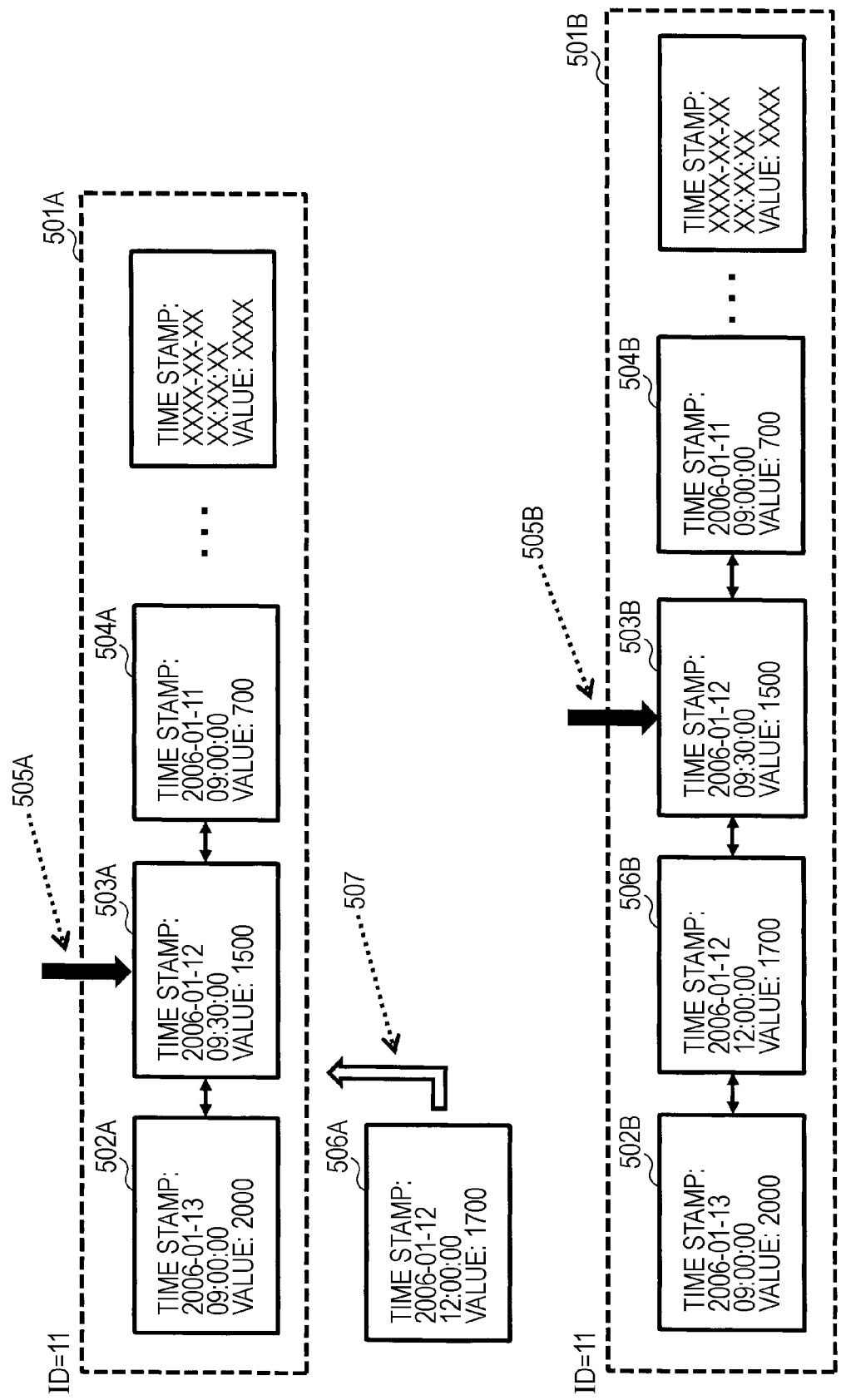

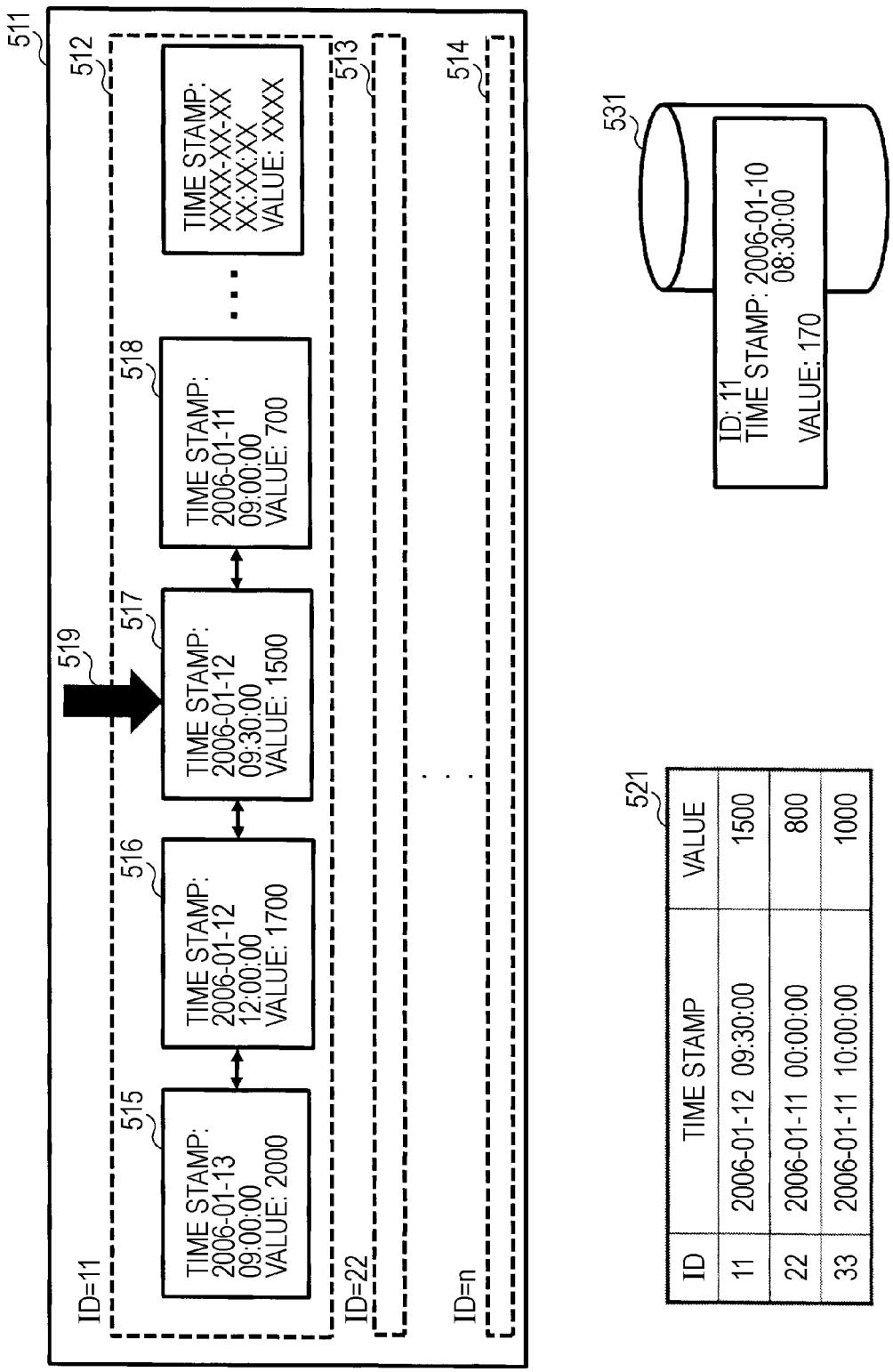

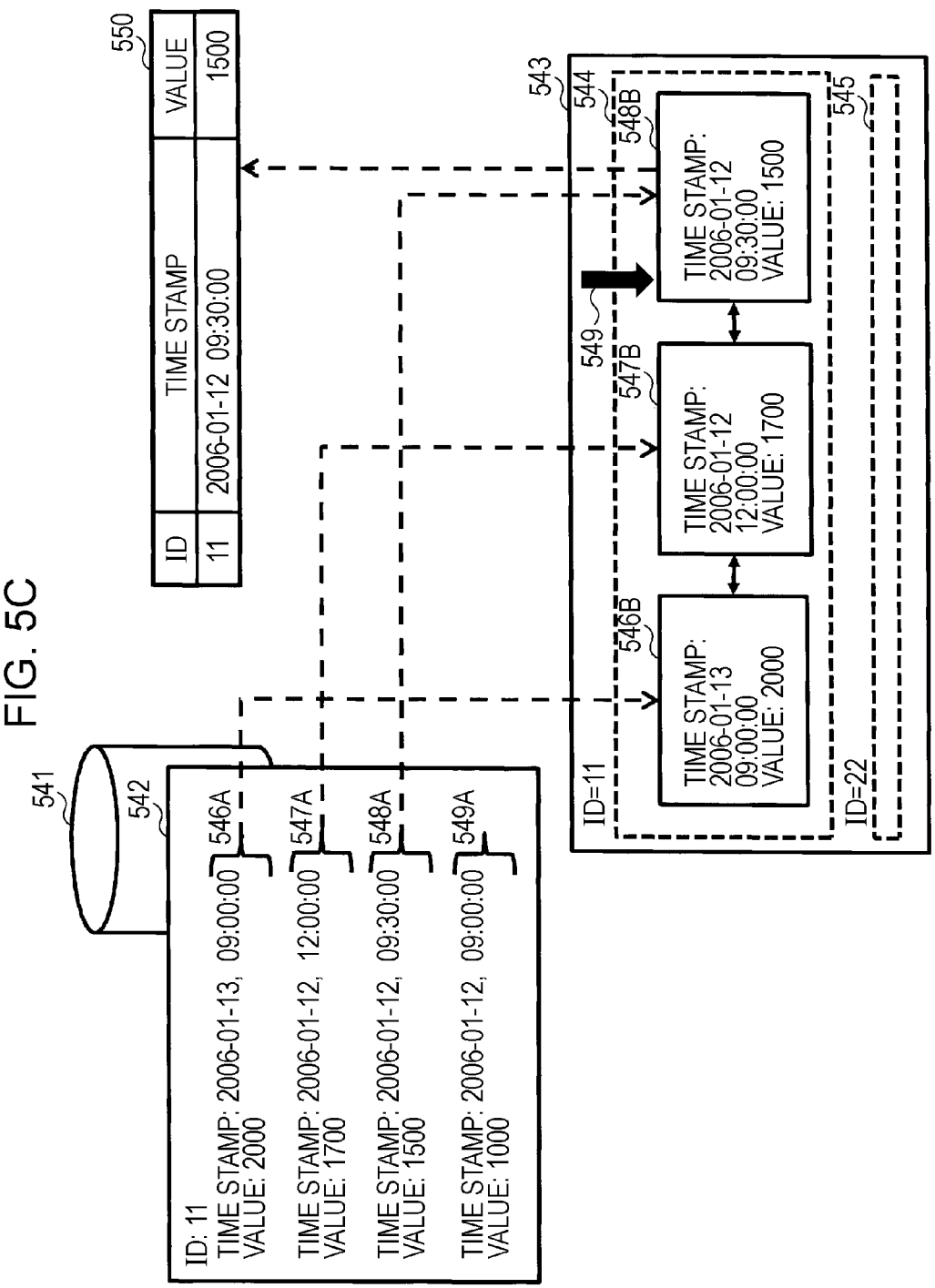

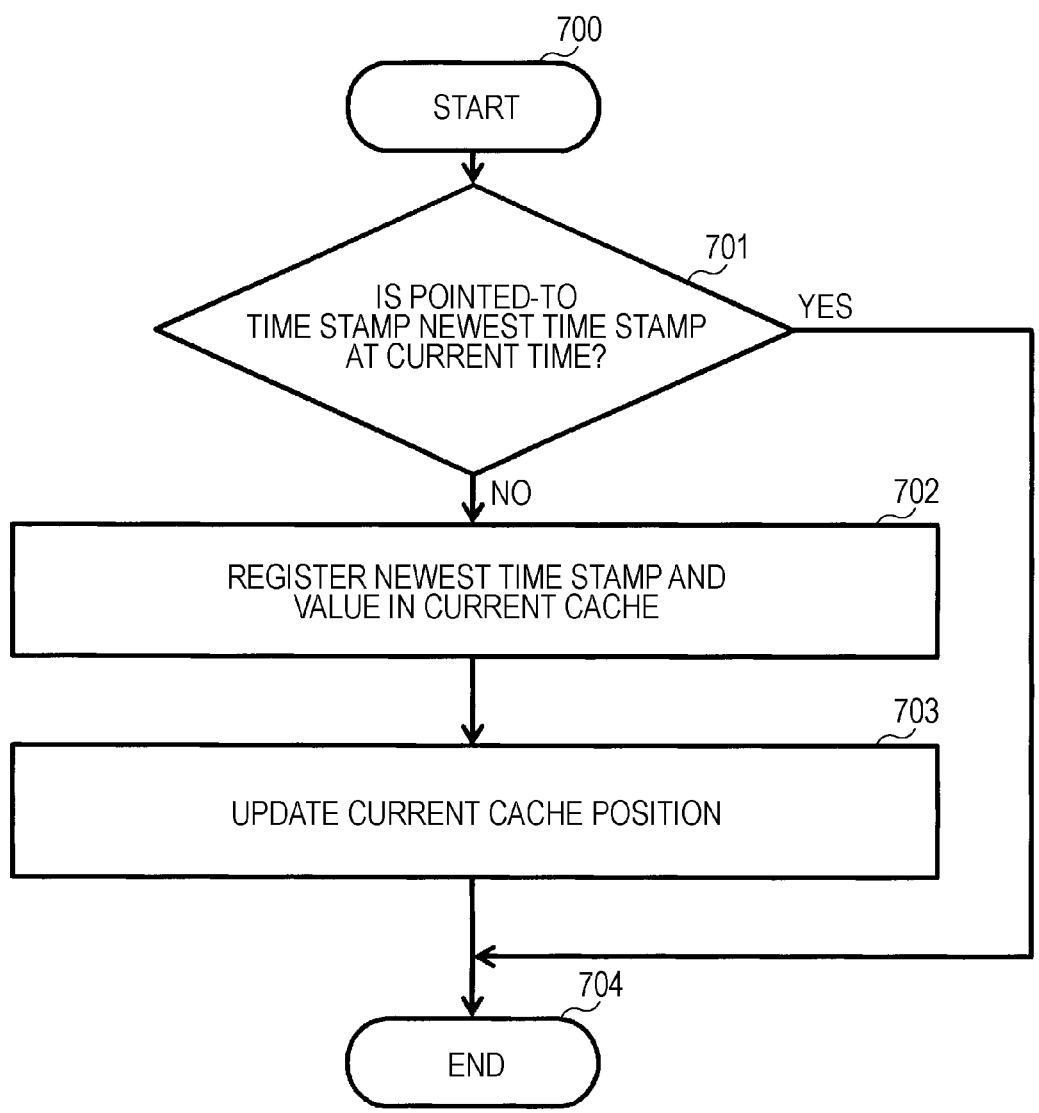

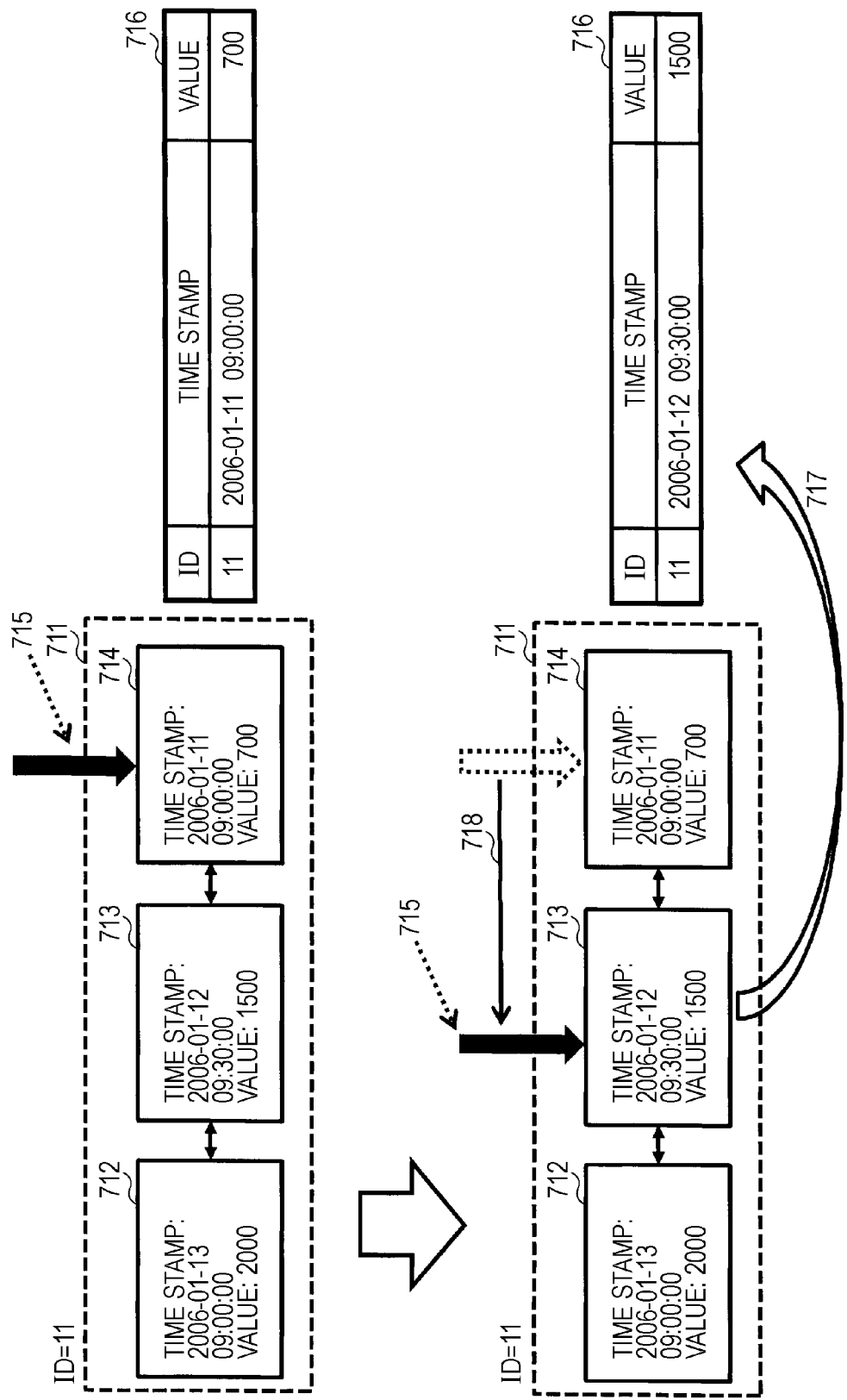

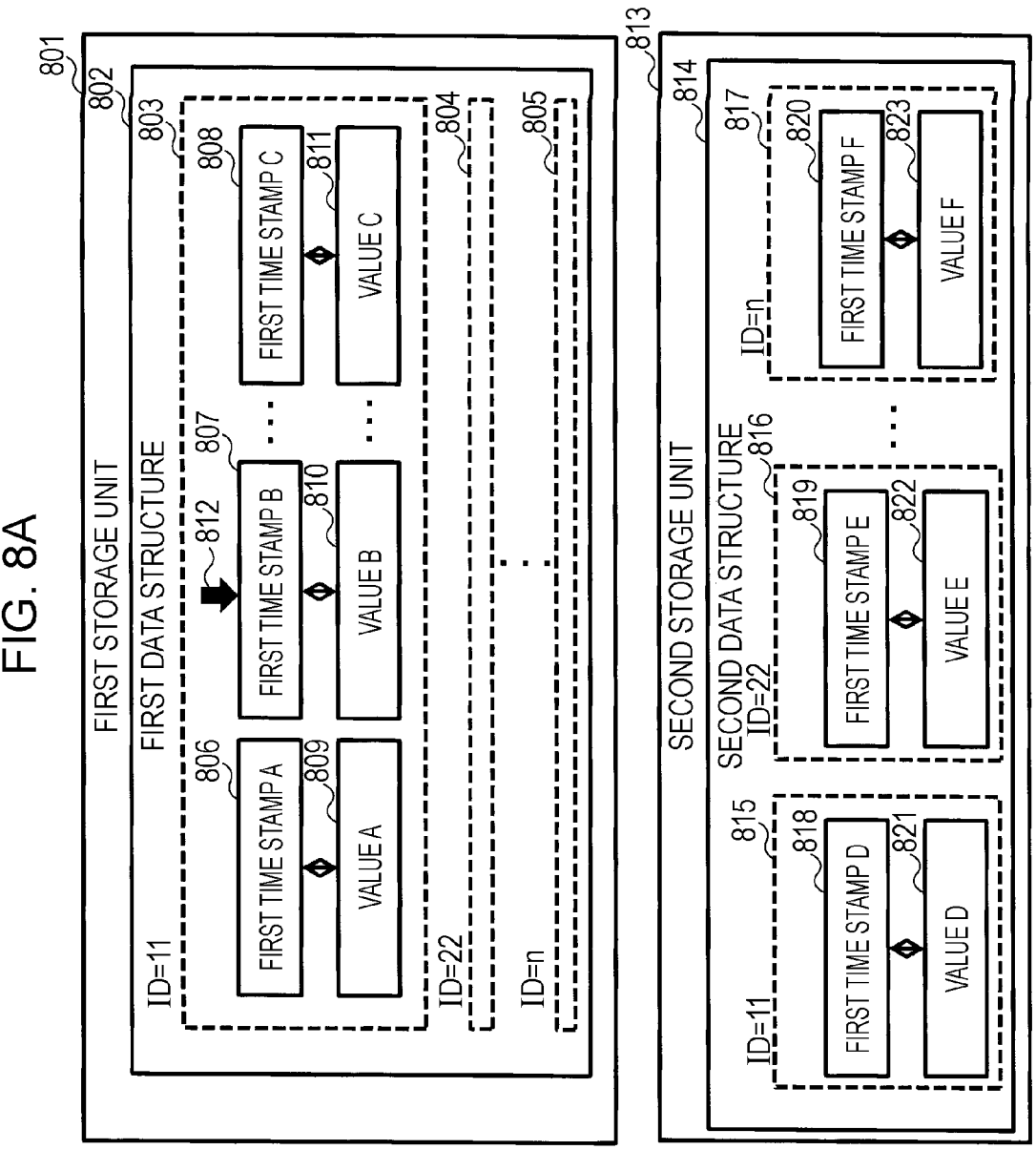

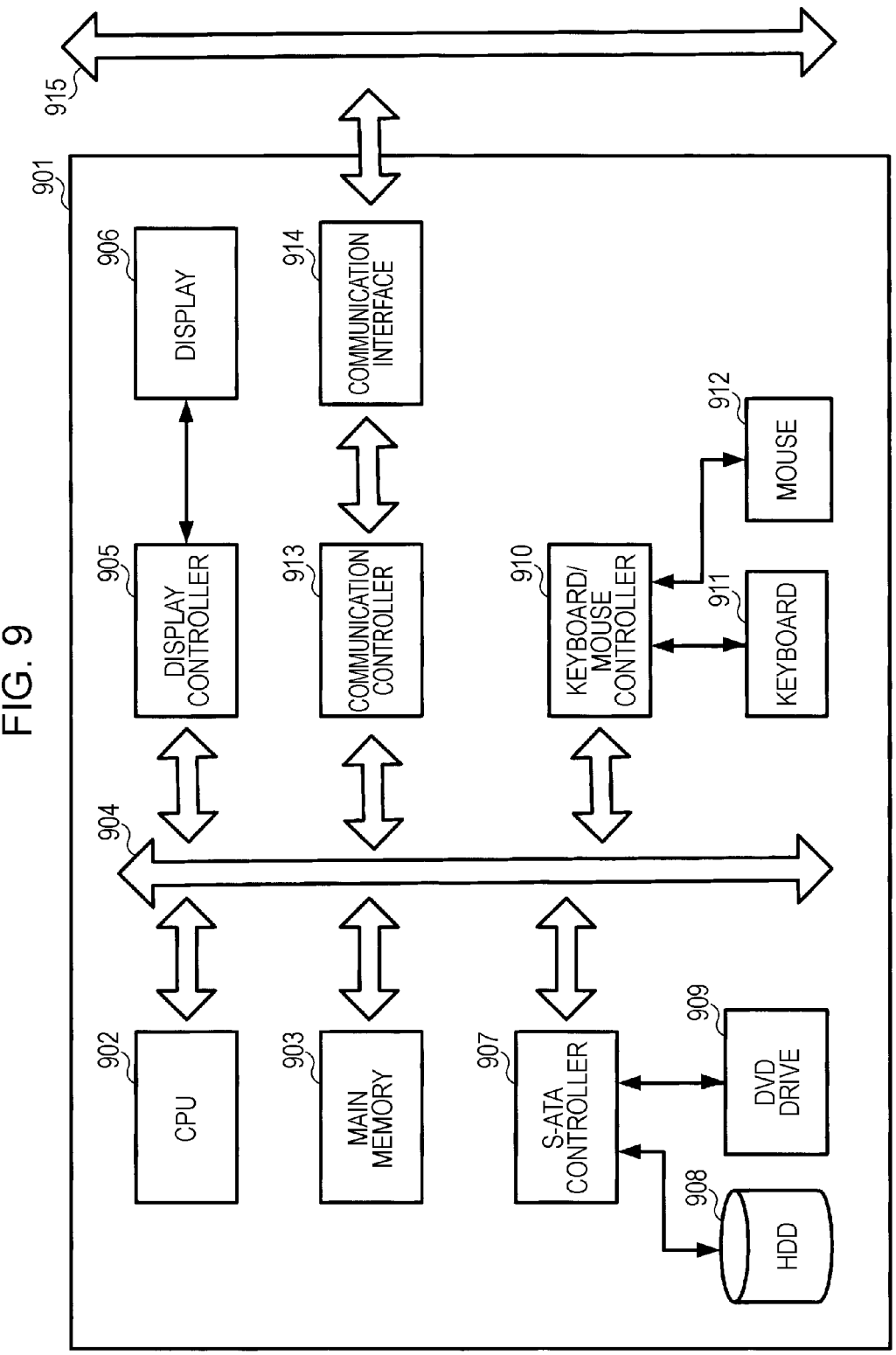

DATA STRUCTURE, COMPUTER SYSTEM, METHOD AND COMPUTER PROGRAM FOR SEARCHING DATABASE

CROSS REFERENCE TO RELATED APPLICATION

This application claims priority under 35 U.S.C. 119 from Japanese Patent Application 2009-39918, filed Feb. 23, 2009, the entire contents of which are incorporated herein by reference.

BACKGROUND OF THE INVENTION

1. Field of the Invention

The present invention relates to data structures, computer systems, methods, and computer programs for searching a database.

2. Description of Related Art

In a typical database system, data processing includes reference, insertion, update, and deletion. However, in an insert-only database system, insertion, update, and deletion of the data processing are all expressed as insertion processing. In the insert-only database system, when the insertion processing including insertion, update, and deletion of data in the database is executed, data in the database is not directly rewritten and is newly inserted into the database in a log-like format. Thus, data in the database is stored in a format which allows the user to view a history of past data processing.

Each value stored in the database in a format which allows the user to view a history of past data processing is identified by an ID and a time stamp associated with the value. Each time stamp indicates a time when each value becomes valid. The phrase "value becomes valid" means that the value becomes referable. When a future time is set as a time stamp, a value that becomes referable at the future time can be inserted into the database before the future time is reached.

The insert-only database system is a database system that is seen, for example, in an account system, which is required to process a large volume of transactions at high speed.

As an example of techniques for speeding up data access processing included in a transaction, there is a deferred update in which an update transaction is committed when a system completes writing a transaction log. The system actually reflects all updated data in a database together, asynchronously to execution of the transaction. The deferred update is known to improve throughput of update transactions.

In reference transactions, there is a known technique in which search results are cached in an application. The caching reduces the number of times of access processing, the number of times being a bottleneck in processing time involved in accessing a database. As a result, latency in data access processing can be reduced.

When a reference transaction including reference processing is executed in an insert-only database system, it is necessary to designate a time stamp. The most frequently issued query in reference transactions is a query that returns the latest value among currently valid data at the time. Therefore, since the current time is often designated as the time stamp, the value of the time stamp is changed to the current time for each query. As a result, even if the previous query result is cached and a value to be returned is the same as the previous query result, a difference in time stamp leads to a determination that a cache error has occurred. Thus, even when a value to be obtained is stored in a cache, the value cannot be obtained from the cache and access to the database takes place each time.

The above-described determination that a cache error has occurred is made, because a time stamp field is not specifically recognized as a time data field and is recognized as merely a data space.

SQL shown below is an example of a query indicating that a time stamp field is recognized as merely a data space. In this example, an ID and a time stamp (EffectiveDate) are designated to obtain data from a table CD. In response to the designation, the latest value at the time point of the designated time stamp is returned.

SELECT * FROM CD
WHERE ID=? AND EffectiveDate<=?
ORDER BY EffectiveDate DESC FETCH FIRST 1 ROW ONLY In the SQL described above, the time stamp field is not treated as a time data space and is treated in the same manner as that for a data space for other data, such as an ID.

Japanese Unexamined Patent Application Publication No. 2006-511876 describes an effective caching technique used for an SQL range search in an edge server. This caching technique checks a containment relationship between designated ranges of queries to reuse a reusable cache. For example, assume that a result of the query SELECT employee.id FROM employee WHERE employee.age<25 is stored in a cache. In this case, if the query SELECT employee.id FROM employee WHERE employee.age<30 is issued, data satisfying the range condition, employee.age<25, is obtained from the cache and data satisfying the range conditions, employee.age>=25 and employee.age<30, is obtained from a database.

In the caching technique described above, a determination as to whether each data stored in the cache is the latest data is made using a time stamp. If a query that includes, as a search range, data cached later than a time when each data was cached is issued, cached data is verified. However, in the caching technique described above, a time stamp is used merely to verify cached data and is not used to process a designated query at high speed.

When a query is issued in a database system that designates a time stamp and issues a reference transaction, the current time is set as a time stamp for each query. Therefore, even when a result of the query is present in a cache and a value to be returned is the same as the cached result, a difference in time stamp leads to a determination that a cache error has occurred. As a result, data cannot be obtained from the cache and access to the database takes place each time a query is issued. Accordingly, there is a demand for a method that can speed up a transaction when time stamps are different as described above.

SUMMARY OF THE INVENTION

In accordance with one aspect of the present invention, a computer system for making an inquiry about the latest value at a designated time using a database in which values and information on times associated with the individual values are contained in a table includes: a first storage unit that stores a first data structure, wherein the first data structure includes, for each ID associated with the values in the database, (i) at least a first time stamp that is sorted in chronological order; (ii) values belonging to the individual first time stamps; and (iii) a pointer that designates one of the first time stamps, the first time stamps indicating the times when the values become valid; a second storage unit that stores a second data structure, wherein the second data structure includes, for each ID, (i) the designated first time stamp; and (ii) a value belonging to the designated first time stamp; an accepting unit that accepts an inquiry for retrieving the latest value at a designated time from the database, the inquiry including a description for identifying at least one ID and a second time stamp indicating a time of retrieval; an identifying unit that identifies, from among first time stamps stored in the first storage unit and belonging to the identified ID, a first time stamp having the largest time stamp not exceeding the second time stamp (the first time stamp being hereinafter referred to as a first largest-time-stamp); and an obtaining unit that obtains, from the second storage unit, a value belonging to the identified ID when the designated first time stamp belonging to the identified ID is the same as the first largest-time-stamp.

In accordance with another aspect of the present invention, a method for preparing a data structure that makes it possible to make an inquiry about the latest value at a designated time using a database in which values and information on times associated with the individual values are contained in a table includes the steps of: registering in a first storage unit when an insertion transaction starts, a value to be inserted and a time stamp indicating a time when the value to be inserted becomes valid, the value and the time stamp being included in the transaction, and sorting, in response to the registration, at least one time stamp belonging to an ID corresponding to the value to be inserted in chronological order.

In accordance with a further aspect of the present invention, a method for preparing a data structure that makes it possible to make an inquiry about the latest value at a designated time using a database in which individual values and information on times associated with the individual values are contained in a table, the method initiated when an insertion transaction starts and no time stamp belonging to an ID corresponding to a value to be inserted is present in a first storage unit, the value being included in the transaction, includes the steps of: obtaining, by searching the database, the largest time stamp not exceeding the time stamp belonging to the ID corresponding to the value to be inserted, a value belonging to the largest time stamp, a time stamp newer than the time stamp belonging to the ID corresponding to the value to be inserted, and a value belonging to the newer time stamp; registering, in the first storage unit, the obtained largest time stamp, the value belonging to the largest time stamp, the obtained newer time stamp, and the value belonging to the newer time stamp; sorting the registered largest time stamp and the registered newer time stamp in chronological order; designating the registered largest time stamp with a pointer; and further registering the registered largest time stamp and the value belonging to the largest time stamp in a second storage unit.

In yet another aspect of the present invention, a method for making an inquiry about the latest value at a designated time using a database in which values and information on times associated with the individual values are contained in a table includes the steps of: storing a first data structure in a first storage unit, wherein the first data structure includes, for each ID associated with the values in the database, (i) at least a first time stamp that is sorted in chronological order; (ii) values belonging to the individual first time stamps; and (iii) a pointer that designates one of the first time stamps, the first time stamps indicating the times when the values become valid; storing a second data structure in a second storage unit, wherein the second data structure includes, for each ID, (i) the designated first time stamp; and (ii) a value belonging to the designated first time stamp; accepting an inquiry for retrieving the latest value at a designated time from the database, the inquiry including a description for identifying at least one ID and a second time stamp indicating a time of retrieval; identifying, from among first time stamps stored in the first storage unit and belonging to the identified ID, a first largest-time-stamp, the first largest-time-stamp having the largest time stamp not exceeding the second time stamp; and obtaining, from the second storage unit, a value belonging to the identified ID when the designated first time stamp belonging to the identified ID is the same as the first largest-time-stamp.

In a further aspect of the present invention, computer programs are provided which, when executed by a computer, cause it to perform the method steps described above.

In a database system according to preferred embodiments of the present invention, when retrieval is performed by designating a time stamp, it is possible to increase the speed of dealing with requests for the latest data at the current time, the requests being most frequently issued. Additionally, in a database according to the embodiments of the present invention, it is possible to integrate future data.

BRIEF DESCRIPTION OF THE DRAWINGS

For a more complete understanding of the present invention and advantages thereof, reference is now made to the following description taken in conjunction with the accompanying drawings.

FIG. 1 illustrates an example of a table of a database used in an embodiment of the present invention.

FIG. 3A illustrates data of an insert log cache included in an application cache of the application server of FIG. 2 according to the embodiment of the present invention.

FIG. 3B illustrates an example of data included in a current cache of the application server of FIG. 2 according to the embodiment of the present invention.

FIG. 4C illustrates exemplary processing steps for cached data initialization, the steps being executed by the application program of the application server of FIG. 2, according to the embodiment of the present invention.

FIG. 5A illustrates a concrete example of processing for data insertion corresponding to FIG. 4A, according to the embodiment of the present invention.

FIG. 5B illustrates a concrete example of processing for data retrieval corresponding to FIG. 4B, according to the embodiment of the present invention.

FIG. 5C illustrates a concrete example of processing for cached data initialization corresponding to FIG. 4C, according to the embodiment of the present invention.

FIG. 7A illustrates exemplary processing steps for performing maintenance on the insert log cache, the steps being executed by the application program of the application server of FIG. 2, according to the embodiment of the present invention.

FIG. 7B illustrates a concrete example of maintenance processing corresponding to FIG. 7A according to the embodiment of the present invention.

FIG. 8A is an exemplary block diagram of storage units corresponding to the application cache of FIG. 2 according to the embodiment of the present invention.

FIG. 9 is a block diagram illustrating hardware of the application server of FIG. 2 according to the embodiment of the present invention.

DETAILED DESCRIPTION OF PREFERRED EMBODIMENTS

Figure 2:
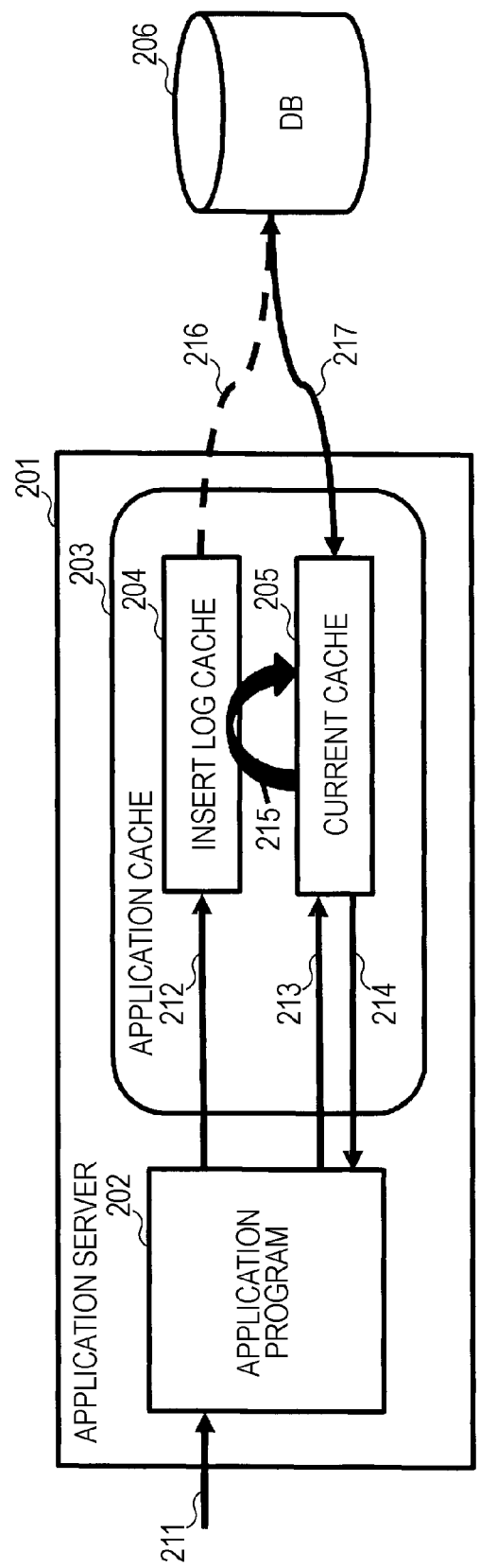
FIG. 2 is an exemplary block diagram illustrating an application server using the database of FIG. 1 according to the embodiment of the present invention.

The present invention provides a first data structure stored in a first storage unit of a computer system that makes an inquiry about the latest value at a designated time using a database in which values and information on times associated with the individual values are contained in a table. The first data structure includes, for each of IDs associated with the values in the database, at least a first time stamp that is sorted in chronological order; values belonging to the individual first time stamps; and a pointer that designates one of the first time stamps, the first time stamps indicating the times when the values become valid.

The present invention also provides, in addition to the first data structure, a second data structure stored in a second storage unit. The second data structure includes, for each of the IDs, the designated first time stamp and a value belonging to the designated first time stamp.

The present invention also provides a computer system for making an inquiry about the latest value at a designated time using a database in which values and information on times associated with the individual values are contained in a table. The computer system includes the first storage unit that stores the first data structure; the second storage unit that stores the second data structure; an accepting unit that accepts an inquiry for retrieving the latest value at a designated time from the database, the inquiry including a description for identifying at least one ID and a second time stamp indicating a time of retrieval; an identifying unit that identifies, from among first time stamps stored in the first storage unit and belonging to the identified ID, a first time stamp, hereinafter referred to as a first largest-time-stamp, having the largest time stamp not exceeding the second time stamp; and an obtaining unit that obtains, from the second storage unit, a value belonging to the identified ID when the designated first time stamp belonging to the identified ID is the same as the first largest-time-stamp.

According to one embodiment of the present invention, the obtaining unit may obtain, from the first storage unit, a value belonging to the first largest-time-stamp when the designated first time stamp belonging to the identified ID is older than the first largest-time-stamp.

According to another embodiment of the present invention, the computer system may further include a replacing unit that replaces the designated first time stamp belonging to the identified ID and the value belonging to the designated first time stamp, the designated first time stamp and the value being stored in the second storage unit, with the first largest-time-stamp and the value belonging to the first largest-time-stamp, respectively.

According to another embodiment of the present invention, the computer system may further include a changing unit that changes a time stamp designated by the pointer from the designated first time stamp belonging to the identified ID to the first largest-time-stamp.

According to another embodiment of the present invention, when the second time stamp is older than the designated first time stamp stored in the second storage unit and belonging to the identified ID, the obtaining unit may obtain, from the database, the largest time stamp, hereinafter referred to as a second largest-time-stamp, belonging to the identified ID and not exceeding the second time stamp and a value belonging to the second largest-time-stamp; and when the first largest-time-stamp is newer than the obtained second largest-time-stamp, the obtaining unit may obtain a value belonging to the first largest-time-stamp from the first storage unit.

According to another embodiment of the present invention, when the obtained second largest-time-stamp is newer than the first largest-time-stamp, the obtaining unit may determine a value belonging to the obtained second largest-time-stamp to be an obtained value.

According to another embodiment of the present invention, when no value belonging to an ID to be retrieved is present in the second storage unit, the obtaining unit may search the database to obtain a value belonging to the largest time stamp not exceeding the second time stamp.

According to another embodiment of the present invention, the accepting unit may accept a transaction for inserting a value into the database; and the computer system may further include a registering unit that registers, in the first storage unit, a value to be inserted and a third time stamp indicating a time when the value to be inserted becomes valid, the value and the third time stamp being included in the transaction.

According to another embodiment of the present invention, the computer system may further include a sorting unit that sorts, in response to the registration and in chronological order, first time stamps belonging to an ID corresponding to the value to be inserted.

According to another embodiment of the present invention, the computer system may further include a confirming unit that commits the transaction upon completion of the sorting.

According to another embodiment of the present invention, when no first time stamp belonging to an ID corresponding to the value to be inserted is present in the first storage unit, the obtaining unit may search the database to further obtain the largest time stamp belonging to the ID corresponding to the value to be inserted and not exceeding the third time stamp, a value belonging to the largest time stamp, a time stamp belonging to the ID corresponding to the value to be inserted and newer than the third time stamp, and a value belonging to the time stamp and the registering unit may further register, in the first storage unit, the obtained largest time stamp, the value belonging to the largest time stamp, the obtained newer time stamp, and the value belonging to the newer time stamp; and the computer system may further include a sorting unit that sorts the registered largest time stamp and the registered newer time stamp in chronological order.

According to another embodiment of the present invention, the computer system may further include a designating unit that designates the registered largest time stamp with the pointer; and the registering unit may further register, in the second storage unit, the registered largest time stamp and the value belonging to the registered largest time stamp.

According to another embodiment of the present invention, the computer system may further include a deleting unit that deletes, when a deferred update is executed on the database, first time stamps indicating times older than the designated first time stamp and values belonging to the first time stamps from the first storage unit.

According to another embodiment of the present invention, the computer system may further include a changing unit that periodically changes a time stamp, hereinafter referred to as a third largest-time-stamp, designated by the pointer from the designated first time stamp to the largest first time stamp not exceeding the current time.

According to another embodiment of the present invention, the computer system may further include a replacing unit that replaces, in response to the changing, the designated first time stamp and a value belonging to the designated first time stamp stored in the second storage unit with the third largest-time-stamp and a value belonging to the third largest-time-stamp, respectively.

The present invention also provides a method for preparing a data structure that makes it possible to make an inquiry about the latest value at a designated time using a database in which values and information on times associated with the individual values are contained in a table. The method causes the computer system to execute the following steps. The steps include the steps of registering, when an insertion transaction starts, a value to be inserted and a time stamp indicating a time when the value to be inserted becomes valid, the value and the time stamp being included in the transaction, in a first storage unit; and sorting, in response to the registration, at least one time stamp included in the first storage unit and belonging to an ID corresponding to the value to be inserted in chronological order.

The present invention also provides a method for preparing a data structure that makes it possible to make an inquiry about the latest value at a designated time using a database in which values and information on times associated with the individual values are contained in a table. The method causes the computer system to execute the following steps. The steps include the steps of, when an insertion transaction starts and no time stamp belonging to an ID corresponding to a value to be inserted, the value being included in the transaction, is present in a first storage unit, obtaining, by searching the database, the largest time stamp not exceeding the time stamp belonging to the ID corresponding to the value to be inserted, a value belonging to the largest time stamp, a time stamp newer than the time stamp belonging to the ID corresponding to the value to be inserted, and a value belonging to the newer time stamp; registering, in the first storage unit, the obtained largest time stamp, the value belonging to the largest time stamp, the obtained newer time stamp, and the value belonging to the newer time stamp; sorting the registered largest time stamp and the registered newer time stamp in chronological order; designating the registered largest time stamp with a pointer; and further registering the registered largest time stamp and the value belonging to the largest time stamp in a second storage unit.

The present invention also provides a method for making an inquiry about the latest value at a designated time using a database in which values and information on times associated with the individual values are contained in a table. The method causes the computer system to execute the following steps. The steps include the steps of storing the data structure in a first storage unit; storing the data structure in a second storage unit; accepting an inquiry for retrieving the latest value at a designated time from the database, the inquiry including a description for identifying at least one ID and a second time stamp indicating a time of retrieval; identifying, from among first time stamps stored in the first storage unit and belonging to the identified ID, a first time stamp having the largest time stamp not exceeding the second time stamp (the first time stamp being hereinafter referred to as a first largest-time-stamp); and obtaining, from the second storage unit, a value belonging to the identified ID when the designated first time stamp belonging to the identified ID is the same as the first largest-time-stamp.

According to one embodiment of the present invention, the obtaining step may further include the step of obtaining, from the first storage unit, a value belonging to the first largest-time-stamp when the designated first time stamp belonging to the identified ID is older than the first largest-time-stamp.

According to another embodiment of the present invention, the method may cause the computer system to further execute the following step. The step include the step of replacing the designated first time stamp belonging to the identified ID and the value belonging to the designated first time stamp, the designated first time stamp and the value being stored in the second storage unit, with the first largest-time-stamp and the value belonging to the first largest-time-stamp, respectively.

According to another embodiment of the present invention, the method may cause the computer system to further execute the following step. The step includes the step of changing a time stamp designated by the pointer from the designated first time stamp belonging to the identified ID to the first largest-time-stamp.

According to another embodiment of the present invention, when the second time stamp is older than the designated first time stamp stored in the second storage unit and belonging to the identified ID, the obtaining step may further include the step of obtaining, from the database, the largest time stamp belonging to the identified ID and not exceeding the second time stamp (the largest time stamp being hereinafter referred to as a second largest-time-stamp) and a value belonging to the second largest-time-stamp; and when the first largest-time-stamp is newer than the obtained second largest-time-stamp, the obtaining step may further include the step of obtaining a value belonging to the first largest-time-stamp from the first storage unit.

According to another embodiment of the present invention, when no value belonging to an ID to be retrieved is present in the second storage unit, the obtaining step may further include the step of obtaining, by searching the database, a value belonging to the largest time stamp not exceeding the second time stamp.

According to another embodiment of the present invention, the accepting step may include the step of accepting a transaction for inserting a value into the database.

According to another embodiment of the present invention, the method may cause the computer system to further execute the following step. The step includes the step of registering, in the first storage unit, a value to be inserted and a third time stamp indicating a time when the value to be inserted becomes valid, the value and the third time stamp being included in the transaction.

According to another embodiment of the present invention, the method may cause the computer system to further execute the following step. The step includes the step of sorting, in response to the registration and in chronological order, first time stamps belonging to an ID corresponding to the value to be inserted.

According to another embodiment of the present invention, the method may cause the computer system to further execute the following step. The step includes the step of committing the transaction upon completion of the sorting.

According to another embodiment of the present invention, the method may cause the computer system to further execute the following step. When no first time stamp belonging to an ID corresponding to the value to be inserted is present in the first storage unit, the step includes the step of obtaining, by searching the database, the largest time stamp belonging to the ID corresponding to the value to be inserted and not exceeding the third time stamp, a value belonging to the largest time stamp, a time stamp belonging to the ID corresponding to the value to be inserted and newer than the third time stamp, and a value belonging to the time stamp.

The registering step further includes the step of registering, in the first storage unit, the obtained largest time stamp, the value belonging to the largest time stamp, the obtained newer time stamp, and the value belonging to the newer time stamp.

According to another embodiment of the present invention, the method may cause the computer system to further execute the following step. The step includes the step of sorting the registered largest time stamp and the registered newer time stamp in chronological order.

According to another embodiment of the present invention, the method may cause the computer system to further execute the following step. The step includes the step of designating the registered largest time stamp with the pointer.

The registering step further includes the step of registering, in the second storage unit, the registered largest time stamp and the value belonging to the registered largest time stamp.

According to another embodiment of the present invention, the method may cause the computer system to further execute the following step. The step includes the step of deleting, when a deferred update is executed on the database, first time stamps indicating times older than the designated first time stamp and values belonging to the first time stamps from the first storage unit.

According to another embodiment of the present invention, the method may cause the computer system to further execute the following step. The step includes the step of periodically changing a time stamp designated by the pointer from the designated first time stamp to the largest first time stamp not exceeding the current time (hereinafter referred to as a third largest-time-stamp).

According to another embodiment of the present invention, the method may cause the computer system to further execute the following step. The step includes the step of replacing, in response to the changing, the designated first time stamp and a value belonging to the designated first time stamp stored in the second storage unit with the third largest-time-stamp and a value belonging to the third largest-time-stamp.

The present invention also provides a computer program for making an inquiry about the latest value at a designated time using a database in which values and information on times associated with the individual values are contained in a table. The computer program causes a computer to execute each step of any one of the methods described above.

According to one embodiment of the present invention, the database may be an insert-only database.

In this description of preferred embodiments of the present invention, the following definitions and conventions are used.

The phrase "database in which values and information on times associated with the individual values are contained in a table" refers to a database in which values are stored together with information on times associated with the values. The database is, for example, an insert-only database. A table of the database contains "ID", "value", and "time stamp", which are, for example, column items of the database. "ID", "value", and "time stamp" may be contained in different tables, which are liked to each other. For example, if table A contains "ID", table B contains "value", and table C contains "time stamp", it is only necessary that tables A to C be linked to each other by a common key item.

"ID" is an item for identifying a type of value. An ID is expressed, for example, as a unique identifier for each type of value. For example, if a database is a bank account database including types of values, such as "account holder", "amount deposited", "amount withdrawn", and "balance", IDs are expressed as an identifier "10" indicating an account holder, an identifier "11" indicating an amount deposited, an identifier "12" indicating an amount withdrawn, and an identifier "13" indicating the balance. A type of value may be a combination of a plurality of different types. For example, a type of value may be "account activity", which is a combination of an amount deposited and an amount withdrawn.

"Value" is an item indicating a specific value belonging to an ID. For example, if an ID is the identifier "10" indicating an account holder, the value is a specific name of the account holder, such as "Taro Yamada".

"Time stamp" is an item indicating information on a time associated with a value. A time stamp indicates a time when a value becomes valid. The information on a time is information that can identify the order of each time stamp. The information on a time is an identifier associated with a year, a year/month/date, a time, or a time period. For example, if a value is "10000" indicating a specific amount deposited, the time stamp indicates a time "2008-12-24 09:00:00" at which money was deposited.

Information on a time that is set as a time stamp is referred to as a data valid time.

IDs, values, and time stamps may be data of any format that is supported by the database. For example, the format may be a numeric type, a character type, a date type, or a BOOLEAN type.

An ID has a one-to-many relationship with values and time stamps. For example, if "10000" was deposited at "2008-12-24 09:00:00" and "15000" was deposited at "2008-12-25 09:00:00", the value "10000", the value "15000", the time stamp "2008-12-24 09:00:00" and the time stamp "2008-12-25 09:00:00" belong to the ID "11" indicating "amount deposited".

The phrase "making an inquiry" means to make an inquiry about data included in a database. For example, this means to issue a query to a database application. For example, SQL is used as a query language.

An inquiry includes a description for identifying an ID and a time stamp.

A description for identifying an ID is a description indicating conditions that the ID is an identifier, the ID is within a certain range, and the identifier indicating the ID is greater than or smaller than a certain value. For example, if a query is an SQL query, the description is a "where" clause description. A plurality of IDs may be identified.

The phrase "making an inquiry about the latest value at a designated time" means, for example, to issue a search query to a database, the search query designating an ID that corresponds to a value and a time stamp that corresponds to the value and indicates a designated time. The latest value is a value belonging to a time stamp largest among time stamps not exceeding the designated time. For example, a "select" sentence in SQL is used as a search query. The time stamp indicating the designated time does not necessarily indicates the current time. It is possible that the time stamp indicates a past or future time.

The phrase "time stamps sorted in chronological order" means that information on times indicated by time stamps is sorted in descending or ascending order. Since time stamps are associated with values, sorting the time stamps in chronological order makes it possible to sort the values.

The phrase "deferred update" is a technique in which an update transaction is committed when a system completes writing a transaction log. The system actually reflects all updated data in a database together, asynchronously to execution of the transaction.

"Transaction" refers to a group of processing performed on a database. The processing is executed, for example, by a group of queries. The queries are, for example, SQL queries. The group of processing means, for example, to update values belongs to an ID contained in a plurality of tables.

Hereinafter, embodiments of the present invention will be described with reference to the drawings. It is to be understood that the present embodiments are provided for explaining preferred modes of the present invention, and are not intended to limit the scope of the present invention to that described herein. Unless otherwise stated, the same reference numerals denote the same elements throughout the drawings.

FIG. 1 illustrates an example of a table of a database used in an embodiment of the present invention. A table (101) contains "ID", "value", and "time stamp". "ID" is a column item for identifying a type of value. "Value" is a column item indicating a specific value belonging to an ID. "Time stamp" is a column item indicating information on a time associated with a value.

For example, if an inquiry about the latest value for ID=11 has been made at 11:00 on Jan. 10, 2006, a value in a first record (102) is returned. A value in a second record (103) is not returned as the latest value, since a time indicated by the corresponding time stamp has not been reached.

FIG. 2 is an exemplary block diagram illustrating an application server using the database of FIG. 1 according to the embodiment of the present invention.

An application server (201) is a computer system including an application program (202) and an application cache (203). The application server (201) may further include a database (DB) (206). The application server (201) processes a transaction (211) and reflects the result in the database (206). The application program (202) is a program that processes the transaction (211). The application cache (203) is a cache area prepared for the application program (202). The application cache (203) includes an insert log cache (204) and a current cache (205). The insert log cache (204) is a log area for recording, for each ID, inserted values and time stamps corresponding to the values. The current cache (205) is an area for storing, for each ID, a value returned as "the latest value at the current time" and a time stamp corresponding to the value.

When the transaction (211) is insertion of a value, the application program (202) stores a transaction log in the insert log cache (204) in the form of a linked list, the transaction log being a log of data insertion queries. The linked list is sorted, for each ID, in order of time stamps corresponding to values. Data insertion (212) is reflected (216) in the database (206) asynchronously.

When the transaction (211) is retrieval of a value, the application program (202) tries to obtain (213) a value from the current cache (205). If a time stamp designated by a data retrieval query is newer than a time stamp stored in the current cache (205) and belonging to an ID designated by the query, a value in the application cache (203) is returned (214) as the latest value to the application program (202). If the time stamp designated by the data retrieval query is older than the time stamp stored in the current cache (205) and belonging to the ID designated by the query, inquiries (215 and 217) to the insert log cache (204) and the database (206) are made. Results of the inquiries are compared and the latest value at a time point designated by the time stamp is returned (214) to the application program (202).

The embodiment of the present invention assumes a system that mostly deals with queries for returning the latest value at the designated current time. Therefore, the time stored in the current cache (205) is mostly later than the time indicated by the query's time stamp included in the transaction (211). This makes it possible to reduce the number of accesses to the database and reduce latency in retrieval.

To enable data in a cache to serve specifically as time data, the user may identify the application cache (203) as a time data field in advance. Then, the application program (202) may be extended to serve as a mechanism that recognizes the time data field as time data, and allows the cache to store the time data in sequence. The application program (202) causes the application cache (203) to determine whether the cache can be used or it is necessary to access the database (206), and returns appropriate data. A front-end application program (not shown) does not have to take a data access destination into consideration and can be used without change.

In the embodiment of the present invention, maintenance is performed on a method of storing data in the application cache (203) using the fact that a data valid time field is time data. The maintenance makes it possible to achieve both high-speed insertion and retrieval. In the application cache (203), records that store queries for each ID are sorted in chronological order, and pairs of a value and a time stamp are stored as a linked list. Then, a current cache position pointer that points to the latest value returned in the previous query is stored. Thus, in most cases, an additional cost involved in insertion can be limited to that involved once in comparison with an entry pointed to by the pointer. Moreover, without having to make an inquiry to the database, it is possible to obtain, from the cache, the latest value at a time point indicated by the time stamp at the time of retrieval.

An overview of a data insertion procedure according to the embodiment of the present invention will now be described.

When an insertion transaction starts, the computer system writes logs of the transaction to the insert log cache (204) on the application cache (203), the insert log cache (204) being a log cache for deferred update of the database. The computer system arranges the transaction logs on the insert log cache (204) into a list sorted for each ID in order of time stamps. Upon completion of the arrangement, the transaction is committed. If, in the insert log cache (204), there is no log for an ID corresponding to an inserted value, the computer system obtains, from the database (206), the latest data and future data as logs for the ID. Then, the computer system arranges the latest data and the future data into a list sorted in order of time stamps.

An overview of a data retrieval procedure according to the embodiment of the present invention will now be described.

When a retrieval transaction starts, the computer system reflects information on the insert log cache (204) in the period from a time stamp indicated as a current cache position to a time stamp included in the retrieval transaction, and returns the latest data. The computer system changes a pointer of the current cache position such that it points to the data returned as a result of the query. If a time designated by the time stamp included in the retrieval transaction is older than a time designated by the time stamp indicated as the current cache position, the computer system compares the time stamp included in the insert log cache (204) with that included in the result of the inquiry to the database, and returns the latest data at the time designated by the time stamp included in the retrieval transaction.

FIG. 3A illustrates data of an insert log cache included in an application cache of the application server of FIG. 2 according to the embodiment of the present invention.

An insert log cache (301) stores pairs (302 to 305) each including a time stamp and a value corresponding to an insertion query. Each time a pair of a time stamp and a value is inserted into the insert log cache (301), the pairs (302 to 305) are sorted for each ID in order of time stamps. In this example of the insert log cache (301), for ID=11, the pairs are arranged in order from left to right such that those including newer time stamps are located on the left side. A current cache position pointer points to a time stamp and a value stored in a current cache.

FIG. 3B illustrates an example of data included in a current cache of the application server of FIG. 2 according to the embodiment of the present invention.

For each ID, a current cache (311) stores a value and a time stamp included in a pair pointed to by a current cache position pointer.

Figure 4A:
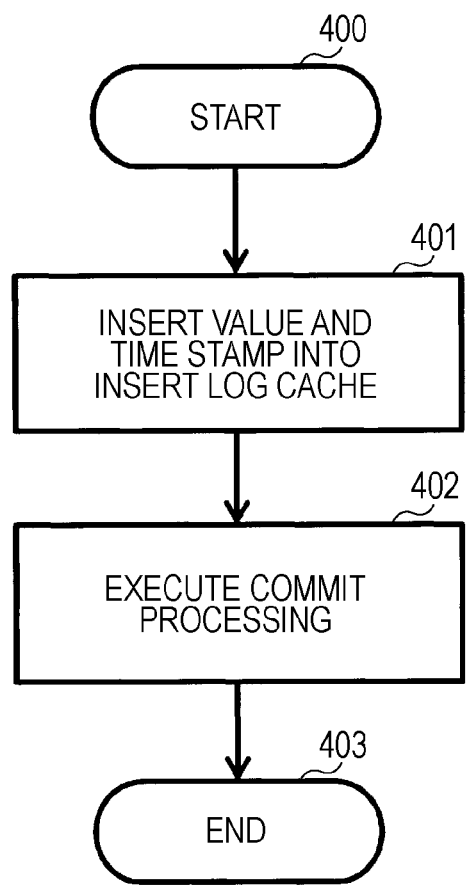
FIG. 4A illustrates exemplary processing steps for data insertion, the steps being executed by an application program of the application server of FIG. 2, according to the embodiment of the present invention.

FIG. 4A illustrates exemplary processing steps for data insertion, the steps being executed by an application program of the application server of FIG. 2, according to the embodiment of the present invention.

Data insertion is executed by a data insertion query. A data insertion query includes an ID, a time stamp, and a value. A data insertion query is a query for registering a value in a database for each ID and time stamp.

When a data insertion query is issued, the computer system executes steps S401 and S402 described below. This execution updates a list for an ID designated by the query, the list being registered in an insert log cache. If the list is not registered in the insert log cache, the computer system executes processing steps for initializing cached data described below (steps S421 to S424 of FIG. 4C) before executing steps S400 to S403.

The processing starts in step S400.

In step S401, the computer system inserts a value and a time stamp into the insert log cache. In a list for an ID corresponding to a value designated by a data insertion query, the computer system registers a pair of the value and a time stamp designated by the data insertion query. Then, the computer system sorts pairs included in the list in order of times indicated by time stamps included in the individual pairs. Upon completion of the sorting, the processing proceeds to step S402.

In step S402, the computer system commits the data insertion query to terminate the data insertion processing.

The processing ends in step S403.

Figure 4B:
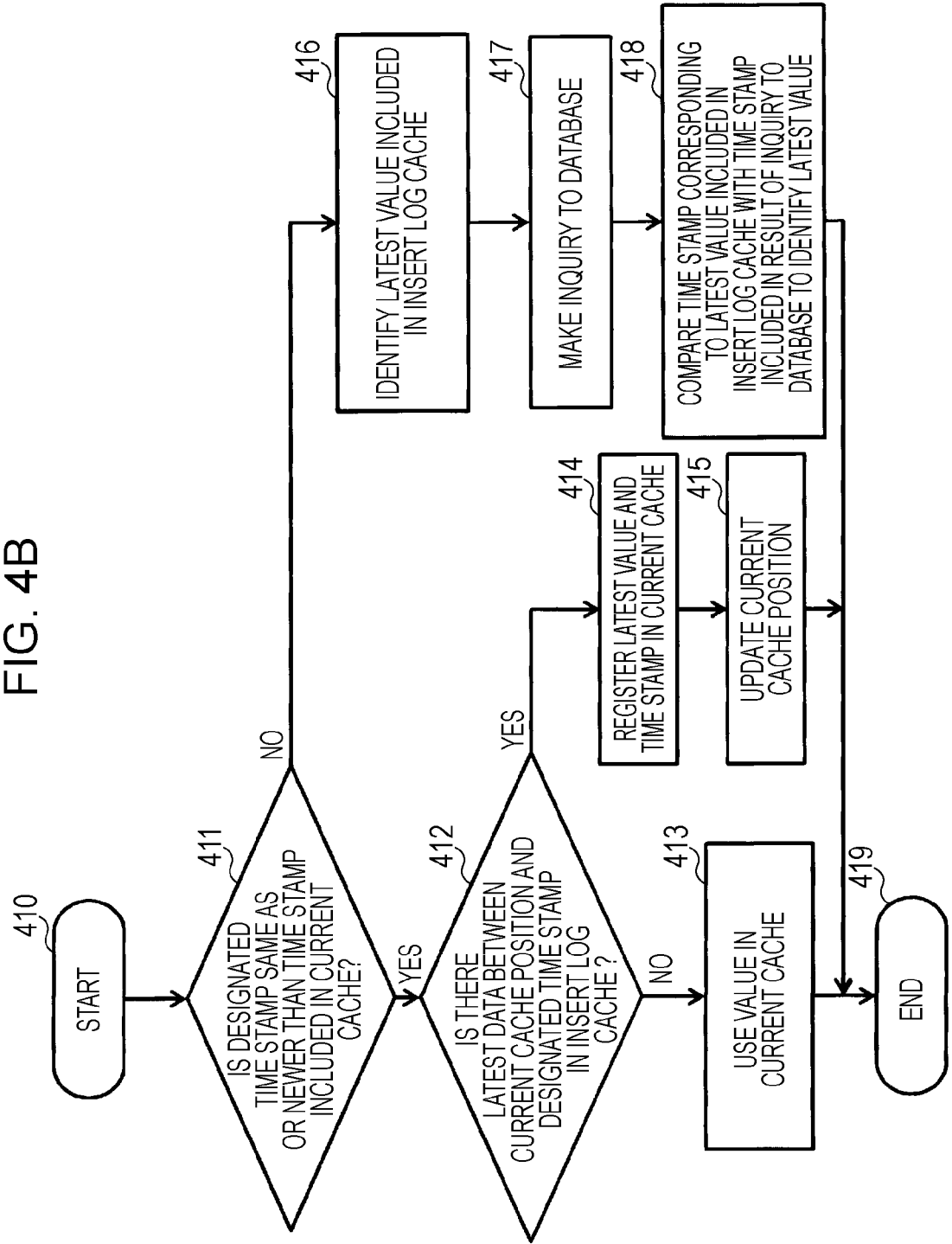
FIG. 4B illustrates exemplary processing steps for data retrieval, the steps being executed by the application program of the application server of FIG. 2, according to the embodiment of the present invention.

FIG. 4B illustrates exemplary processing steps for data retrieval, the steps being executed by the application program of the application server of FIG. 2, according to the embodiment of the present invention.

When a data retrieval query is issued, the computer system executes steps S410 and S419 described below. With this execution, the computer system can obtain a result of the data retrieval from the current cache, insert log cache, or database.

The data retrieval query is a query that searches a table containing IDs, values, and time stamps. A record to be retrieved is a record that includes an ID designated by the query (hereinafter referred to as a designated ID) and a time stamp largest among time stamps that are older than or the same as a time stamp designated by the query (hereinafter referred to as a designated time stamp).

The processing starts in step S410.

In step S411, the computer system determines whether the designated time stamp is the same as or newer than a time stamp included in the current cache. The computer system compares the designated time stamp with a time stamp registered in the current cache and belonging to an ID designated by the data retrieval query (hereinafter referred to as a cached time stamp). If the comparison shows that the designated time stamp is the same as or newer than the cached time stamp, the processing proceeds to step S412. If the designated time stamp is older than the cached time stamp, the processing proceeds to step S416.

In step S412, the computer system examines whether a pair including a time stamp newer than the cached time stamp and not exceeding the designated time stamp is included in a list for the ID designated by the data retrieval query, the list being registered in the insert log cache. The examination checks pairs in the list, from a pair pointed to by the current cache position pointer to a pair including the largest time stamp not exceeding the designated time stamp. If the examination has found one or more pairs including a time stamp newer than the cached time stamp, the computer system determines, of the one or more pairs found, a pair including the largest time stamp not exceeding the designated time stamp as a pair including a result value of the data retrieval. Then, the processing proceeds to step S414. If no pair including a time stamp newer than the cached time stamp has been found, the processing proceeds to step S413.

In step S413, as a result of the data retrieval, the computer system returns a value registered in the current cache and belonging to the designated ID, and terminates the processing.

In step S414, the computer system registers the latest value and the time stamp in the current cache. The computer system replaces the value registered in the current cache and belonging to the designated ID with the value included in the pair found in step S412. At the same time, the computer system replaces the cached time stamp with the time stamp included in the pair found in step S412. Upon completion of the replacement, the processing proceeds to step S415.

In step S415, the computer system updates the current cache position. The computer system changes the current cache position pointer such that it moves to point at the pair found in step S412. The computer system returns the value included in the found pair as a result of the data retrieval, and terminates the processing.

In step S416, the computer system identifies the latest value included in the insert log cache. The computer system checks whether a pair including a time stamp older than the designated time stamp is included in a list for the ID designated by the retrieval query, the list being registered in the insert log cache. If pairs including time stamps older than the designated time stamp have been found by the check, the computer system identifies a pair including the largest time stamp from the pairs found and determines the identified pair as a target of comparison in step S418. Then, the processing proceeds to step S417.

In step S417, the computer system uses the retrieval query to make an inquiry to the database. Upon completion of the inquiry, the processing proceeds to step S418.

In step S418, the computer system compares a time stamp corresponding to the latest value included in the insert log cache with a time stamp included in a result of the inquiry to the database, and identifies the latest value. If there is a pair identified in step S416, the computer system compares a time stamp included in the identified pair with the time stamp obtained in the inquiry. If the comparison shows that the time stamp included in the identified pair is newer, the computer system returns a value included in the identified pair as a result of the data retrieval. If the comparison shows that the time stamp obtained in the inquiry is newer, the computer system returns a value obtained by the inquiry as a result of the data retrieval. The processing thus ends.

If there is no pair identified in step S416, the computer system returns a value obtained by the inquiry as a result of the data retrieval. Then, the processing ends.

The processing ends in step S419.

FIG. 4C illustrates exemplary processing steps for cached data initialization, the steps being executed by the application program of the application server of FIG. 2, according to the embodiment of the present invention.

At the time of data insertion, if a list for an ID associated with a value is not registered in the insert log cache, the computer system executes the following steps S420 to S425. The execution initializes the application cache for the ID.

The processing starts in step S420.

In step S421, the computer system obtains a value belonging to the newest time stamp at the time when the data insertion query has been issued, and values belonging to time stamps indicating future times newer than the time of inquiry. From the database, the computer system obtains records that include the ID corresponding to the values and satisfy one of the following conditions (1) and (2):

(1) A record including the largest time stamp not exceeding the time when the data insertion query has been issued; and (2) A record including a future time stamp newer than the time when the inquiry for obtaining the record has been executed.

In step S422, the computer system registers values in the insert log cache in order of time stamps. The computer system creates a list for the ID corresponding to the values, the list being a list of pairs including a time stamp and a value included in each of the obtained records. The computer system sorts the pairs included in the list in order of times indicated by the time stamps included in the individual pairs. The computer system registers the list in the insert log cache.

For example, in the list to be registered in the insert log cache, the computer system may register the fact that the obtained records including time stamps and values included in the list have already been reflected in the database. For example, the fact that the obtained records have already been reflected in the database may be registered in the list as flags corresponding to the individual pairs. The computer system sets the flags when registering the list in the insert log cache. The flags are referenced by the computer system when a deferred update is executed. The computer system does not execute a deferred update on pairs for which flags are set. This makes it possible to prevent data included in the insert log cache and already reflected in the database from being reflected in the database again by the deferred update. Even if data already reflected in the database is registered redundantly in the database, just inserting the same data into the database does not cause any problems.

In step S423, the computer system registers the value belonging to the newest time stamp at the time of inquiry in the current cache. The computer system registers, in the current cache, a record satisfying the above condition (1) as a record for the ID corresponding to the value.

In step S424, the computer system places a pointer at the value belonging to the newest time stamp at the time of inquiry. The computer system sets the current cache position at a pair of a time stamp and a value registered in the insert log cache, the pair being a pair of a time stamp and a value included in the record satisfying the condition (1) above.

The processing ends in step S425.

FIG. 5A illustrates a concrete example of processing for data insertion corresponding to FIG. 4A, according to the embodiment of the present invention.

A list (501A) is a list for ID=11 registered in the insert log cache. The list (501A) includes pairs (502A to 504A) each including a time stamp and a value. The pair (503A) is a pair pointed to by a current cache pointer (505A).

For example, assume that a data insertion query for registering a value "1700" and a time stamp "2006-01-12 12:00:00" in a database as data corresponding to ID=11 has been issued.

The computer system registers (507) a pair (506A) of the value and the time stamp designated by the query in the list (501A). Then, the computer system sorts the pairs (502A to 504A and 506A) included in the list (501A) in order of time indicated by a time stamp included in each of the pairs (502A to 504A and 506A). Here, the time stamp "2006-01-12 12:00:00" included in the pair (506A) is older than a time stamp "2006-01-13 09:00:00" included in the pair (502A) and newer than a time stamp "2006-01-12 09:30:00" included in the pair (503A). Therefore, the sorting allows the pair (506A) to be located between the pair (502A) and the pair (503A). A list (501B) is a list obtained by the sorting.

Upon completion of the sorting, the computer system commits the data insertion query. This terminates the data insertion processing.

FIG. 5B illustrates a concrete example of processing for data retrieval corresponding to FIG. 4B, according to the embodiment of the present invention.

As a first concrete example, assume that a designated ID for data retrieval is "11" and a designated time stamp is the current time "2006-01-12 11:30:00" at the time of data retrieval.

The computer system compares the designated time stamp with a time stamp included in a current cache (521) and corresponding to ID=11. The time stamp corresponding to ID=11 is "2006-01-12 09:30:00". Therefore, the designated time stamp, which is the current time, is a time stamp newer than the time stamp corresponding to ID=11.

The computer system examines a list (512) for ID=11 included in an insert log cache (511). The list (512) for ID=11 is sorted such that pairs including newer time stamps are located on the left side. The computer system checks the pairs in sequence from a pair (517) pointed to by a current cache position pointer (519) to a pair including the largest time stamp not exceeding the designated time stamp, which is the current time. First, the computer system checks a time stamp included in the pair (517) pointed to by the current cache position pointer (519). This check can be skipped because it is the same processing as the above-described comparison in the current cache (521). The time stamp included in the pair (517) is "2006-01-12 09:30:00", which does not exceed the designated time stamp, which is the current time. Therefore, the computer system further checks a time stamp included in a pair (516).

The time stamp included in the pair (516) is "2006-01-12 12:00:00", which exceeds the designated time stamp, which is the current time. Since no pair including a time stamp newer than the time stamp included in the current cache (521) and corresponding to ID=11 has been found in the list (512), the computer system returns a value registered in the current cache (521) and belonging to ID=11 as a result of the data retrieval.

As a second concrete example, assume that a designated ID for data retrieval is "11" and a designated time stamp is the current time "2006-01-12 17:36:00" at the time of data retrieval.

The computer system compares the designated time stamp with the time stamp included in the current cache (521) and corresponding to ID=11. The time stamp corresponding to ID=11 is "2006-01-12 09:30:00". Therefore, the designated time stamp, which is the current time, is a time stamp newer than the time stamp corresponding to ID=11.

The computer system examines the list (512) for ID=11 included in the insert log cache (511). The list (512) for ID=11 is sorted such that pairs including newer time stamps are located on the left side. The computer system checks the pairs in sequence from the pair (517) pointed to by the current cache position pointer (519) to a pair including the largest time stamp not exceeding the designated time stamp, which is the current time.

First, the computer system checks the time stamp included in the pair (517) pointed to by the current cache position pointer (519). This check can be skipped because it is the same processing as the above-described comparison in the current cache (521). The time stamp included in the pair (517) is "2006-01-12 09:30:00", which does not exceed the designated time stamp, which is the current time. Therefore, the computer system further checks the time stamp included in the pair (516).

The time stamp included in the pair (516) is "2006-01-12 12:00:00", which does not exceed the designated time stamp, which is the current time. Therefore, the computer system further checks a time stamp included in a pair (515). The time stamp included in the pair (515) is "2006-01-13 09:00:00", which exceeds the designated time stamp, which is the current time. Therefore, the computer system determines the pair (516) as a pair including a value that is a result of the data retrieval.

The computer system replaces the value registered in the current cache (521) and belonging to ID=11 with the value included in the pair (516) determined as described above. At the same time, the computer system replaces the time stamp registered in the current cache (521) and corresponding to ID=11 with the time stamp included in the determined pair (516).

The computer system changes the current cache position pointer (519) such that it moves to point at the determined pair (516).

The computer system returns the value included in the determined pair (516) as a result of the data retrieval.

As a third concrete example, assume that a designated ID for data retrieval is "11" and a designated time stamp is "2006-01-12 09:00:00".

The computer system compares the designated time stamp with the time stamp included in the current cache (521) and corresponding to ID=11. The time stamp corresponding to ID=11 is "2006-01-12 09:30:00". Therefore, the designated time stamp is a time stamp older than the time stamp corresponding to ID=11.

The computer system examines the list (512) for ID=11 included in the insert log cache (511). The list (512) for ID=11 is sorted such that pairs including newer time stamps are located on the left side.

The computer system checks whether, of all pairs including time stamps older than the designated time stamp, a pair including the newest time stamp is included in the list (512). Here, the computer system checks whether there is a pair to the immediate right of the pair (517) pointed to by the current cache position pointer (519). Then, a pair (518) is found. Thus, the computer system determines the time stamp "2006-01-11 09:00:00" in the pair (518) as a target of comparison below. Next, the computer system searches a database (531). A time stamp obtained by the search is older than the time stamp determined as a target of the comparison.

Therefore, the computer system returns a value included in the found pair (518) as a result of data retrieval.

When an inquiry including the current time is issued, data on and after the current cache position always becomes a target. If an inquiry designating a future time is issued, the current cache position is not changed.

FIG. 5C illustrates a concrete example of processing for cached data initialization corresponding to FIG. 4C, according to the embodiment of the present invention.

When a list for an ID corresponding to a value inserted by a data insertion query is not present in an insert log cache (543), initialization of cached data is executed.

For example, assume that a list (544) for ID=11 is not registered in the insert log cache (543), while records (546A to 549A) for ID=11 are stored in a database (541). Also, assume that the current time when a data insertion query for registering a value belonging to ID=11 in a database is issued is "2006-01-12 10:00:00".

When the data insertion query is issued, the computer system obtains, from the database (541), pairs of a time stamp and a value belonging to ID=11. The pairs to be obtained include a pair of the largest time stamp not exceeding the current time at the time of issuing the data insertion query and a value belonging to the largest time stamp, and pairs of a time stamp newer than the current time and a value belonging to the time stamp. A time stamp included in the record (546A) is "2006-01-13 09:00:00", which is newer than the current time. Therefore, the computer system obtains a pair of this time stamp and a value included in the record (546A) from the database (541). A time stamp included in the record (547A) is "2006-01-12 12:00:00", which is newer than the current time. Therefore, the computer system obtains a pair of this time stamp and a value included in the record (547A) from the database (541). A time stamp included in the record (548A) is "2006-01-12 09:30:00". This is the largest time stamp not exceeding the current time. Therefore, the computer system obtains a pair of this time stamp and a value included in the record (548A) from the database (541). A time stamp included in the record (549A) is "2006-01-12 09:00:00". This is older than the current time and is not the largest time stamp not exceeding the current time. Therefore, the computer system does not obtain a pair of this time stamp and a value included in the record (549A) from the database (541).

Next, the computer system creates the list (544) for ID=11 in the insert log cache (543). The computer system sorts and registers the obtained pairs in the list (544). The computer system registers a pair (546B) obtained from the record (546A), a pair (547B) obtained from the record (547A), and a pair (548B) obtained from the record (548A) in the list (544), for example, in descending order of time stamps.

Next, the computer system registers, in a current cache (550), the time stamp and the value included in the pair (548B) including the largest time stamp not exceeding the current time.

Last, the computer system places a pointer (549) at the pair (548B).

Figure 6A:
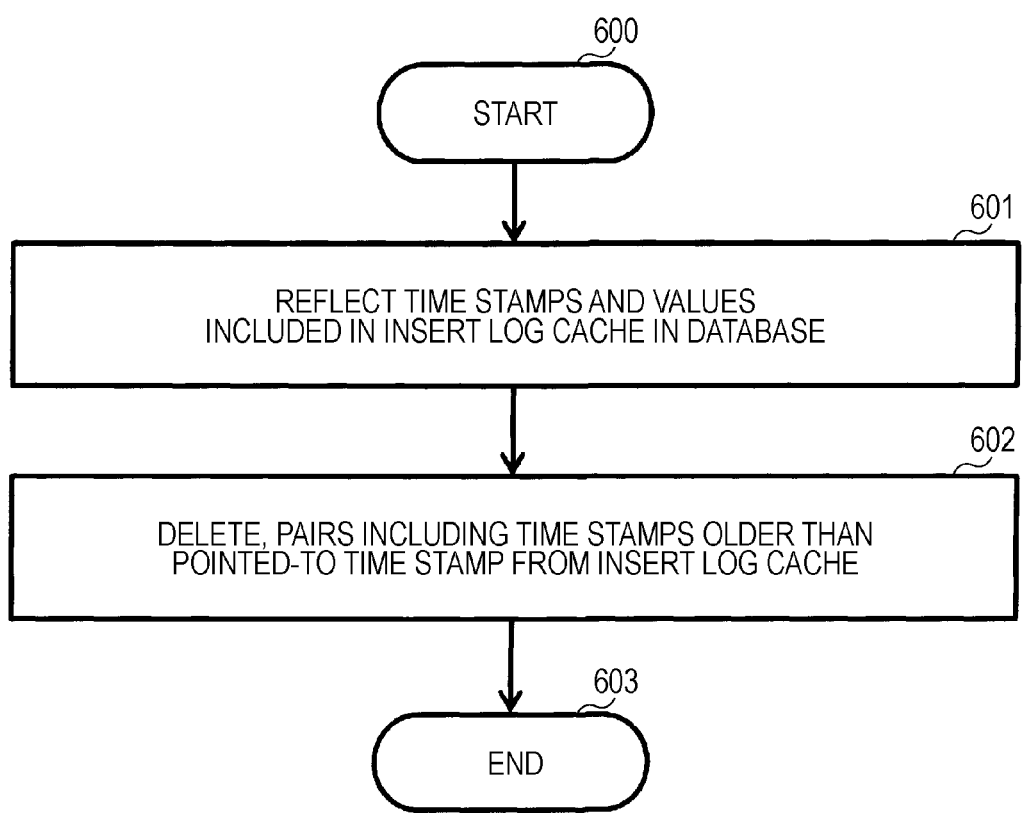
FIG. 6A illustrates exemplary processing steps executed by the application program of the application server of FIG. 2 when a deferred update is executed, according to the embodiment of the present invention.

FIG. 6A illustrates exemplary processing steps executed by the application program of the application server of FIG. 2 when a deferred update is executed, according to the embodiment of the present invention.

When a deferred update is executed on the database, the computer system stores, in an insert log cache, pairs including future time stamps on and after a time stamp selected as the current cache position. Pairs including time stamps corresponding to update times older than the time stamp selected as the current cache position can be deleted after data is reflected in the database by the deferred update.

When a deferred update is executed, the computer system executes the following steps S600 to S603.

The processing starts in step S600.

In step S601, the computer system reflects all time stamps and values included in the insert log cache in the database. A time stamp and a value included in a pair for which a flag indicating that they are already reflected is set may not be reflected in the database.

In step S602, the computer system deletes, from the insert log cache, pairs including time stamps older than a time stamp pointed to by the pointer and terminates the processing.

The processing ends in step S603.

When a deferred update is executed, pairs including future time stamps on and after the time stamp selected as the current cache position are present in the insert log cache, as well as being already reflected in the database. A flag indicating that data is already reflected in the database may be set, for example, for each of the pairs. The computer system sets the flag when each of the pairs is reflected in the database. The flag is referenced by the computer system each time a deferred update is executed. The computer system does not execute a deferred update on a pair for which a flag is set. This makes it possible to prevent data included in the insert log cache and already reflected in the database from being reflected in the database again by the deferred update. Even if data already reflected in the database is registered redundantly in the database, just inserting the same data into the database does not cause any problems.

Figure 6B:
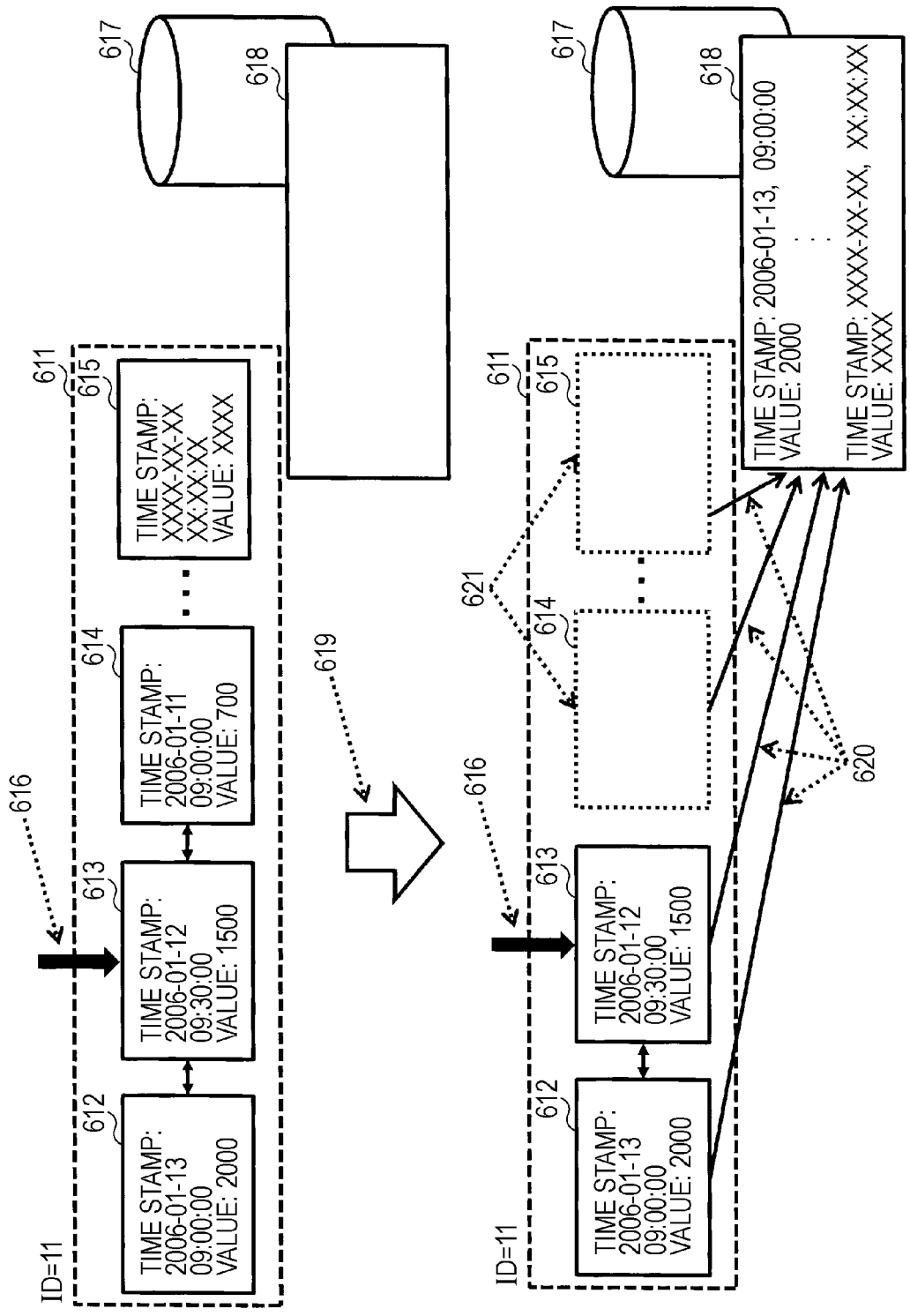
FIG. 6B illustrates a concrete example of processing performed when a deferred update corresponding to FIG. 6A is executed, according to the embodiment of the present invention.

FIG. 6B illustrates a concrete example of processing performed when a deferred update corresponding to FIG. 6A is executed, according to the embodiment of the present invention.

A list (611) is a list for ID=11 registered in the insert log cache. The list (611) includes pairs (612 to 615). The pairs (612 to 615) each include a time stamp and a value. The pair (613) is a pair including a time stamp pointed to by a current cache pointer (616). Assume that no list other than the list (611) is included in the insert log cache.

When a deferred update (619) is executed, the computer system reflects (620) the time stamps and the values included in the pairs (612 to 615) in a database (617). Then, from the insert log cache, the computer system deletes (621) the pairs (614 and 615) including time stamps older than the time stamp pointed to by the current cache pointer (616). When the deletion is completed, the processing performed when a deferred update is executed ends.

FIG. 7A illustrates exemplary processing steps for performing maintenance on the insert log cache, the steps being executed by the application program of the application server of FIG. 2, according to the embodiment of the present invention.

Besides the timing of execution of a query, the current cache position may be periodically updated to indicate the latest data at the current time among data in the insert log cache. The term "periodically" means, for example, hourly or daily. In this case, the application server or the application that manages the insert log cache performs maintenance periodically and voluntarily on the current cache position and data in the current cache. In this maintenance, the current cache position is updated, for each ID, such that it indicates a pair of the largest time stamp not exceeding the time of execution of the maintenance and a value belonging to the largest time stamp. At the same time, the largest time stamp and the value belonging to the largest time stamp are registered in the current cache.

The computer system periodically executes the following steps S700 to S704 for each ID.

The processing starts in step S700.

In step S701, the computer system determines whether a time stamp pointed to by the pointer is the newest time stamp at the current time. If it is determined that the time stamp is the newest one, the processing ends. If it is determined that the time stamp is not the newest one, the processing proceeds to step S702.

In step S702, the computer system registers the newest time stamp and the corresponding value in the current cache. Upon completion of the registration, the processing proceeds to step S703.

In step S703, the computer system updates the current cache position. The computer system changes the position of the pointer such that the newest time stamp is pointed to. The processing ends upon completion of the change.

The processing ends in step S704.

The above-described maintenance increases the probability of returning data at the current cache position as the latest result. It is thus possible to further increase the speed of queries.

FIG. 7B illustrates a concrete example of maintenance processing corresponding to FIG. 7A according to the embodiment of the present invention.

A list (711) is a list for ID=11 registered in the insert log cache. The list (711) includes pairs (712 to 714). The pairs (712 to 714) each include a time stamp and a value. The pair (714) is a pair including a time stamp pointed to by a current cache pointer (715). A current cache (716) stores the time stamp and a value included in the pair (714). Assume that the current time is "2006-01-12 10:00:00".

When maintenance is executed, the computer system determines whether the pair (714) including the pointed-to time stamp is a pair including the newest time stamp at the current time.

Since the pair (713) including the newest time stamp "2006-01-12 09:30:00" that is newer than the time "2006-01-11 09:00:00" indicated by the pointed-to time stamp and does not exceed the current time is included in the list (711), the computer system registers (717) the time stamp and the value included in the pair (713) in the current cache (716).

Next, the computer system updates (718) the pair (714) including the time stamp pointed to by the current cache pointer (715) to the pair (713).

Upon completion of the update, the maintenance processing for ID=11 ends.

FIG. 8A is an exemplary block diagram of storage units corresponding to the application cache of FIG. 2 according to the embodiment of the present invention.

A first storage unit (801) stores a first data structure (802). The first data structure (802) includes lists (803 to 805) for individual IDs. A list for each ID includes at least one time stamp and one value belonging to the time stamp. The lists (803 to 805) of FIG. 8A each include first time stamps A to C (806 to 808) and values A to C (809 to 811) belonging to the first time stamps A to C (806 to 808), respectively. The first time stamps A to C (806 to 808) are sorted in order of times indicated by the time stamps. A pointer (812) points to one of the first time stamps A to C (806 to 808). For example, the pointer (812) points to the first time stamp B (807).

A second storage unit (813) stores a second data structure (814).

The second data structure (814) includes first time stamps D to F (818 to 820) pointed to by pointers and values D to F (821 to 823) belonging to the first time stamps D to F (818 to 820) for IDs (815 to 817), respectively. Since the pointer (812) points to the first time stamp B (807), the first time stamp D (818) is the same time stamp as the first time stamp B (807). Also, the value D (821) is the same value as the value B (810).

The first storage unit (801) and the second storage unit (813) may either be of the same type or different types. If they are storage units of the same type, for example, both the first storage unit (801) and the second storage unit (813) may be memories. If they are storage units of different types, for example, the first storage unit (801) may be a hard disk and the second storage unit (813) may be a memory.

Figure 8B:
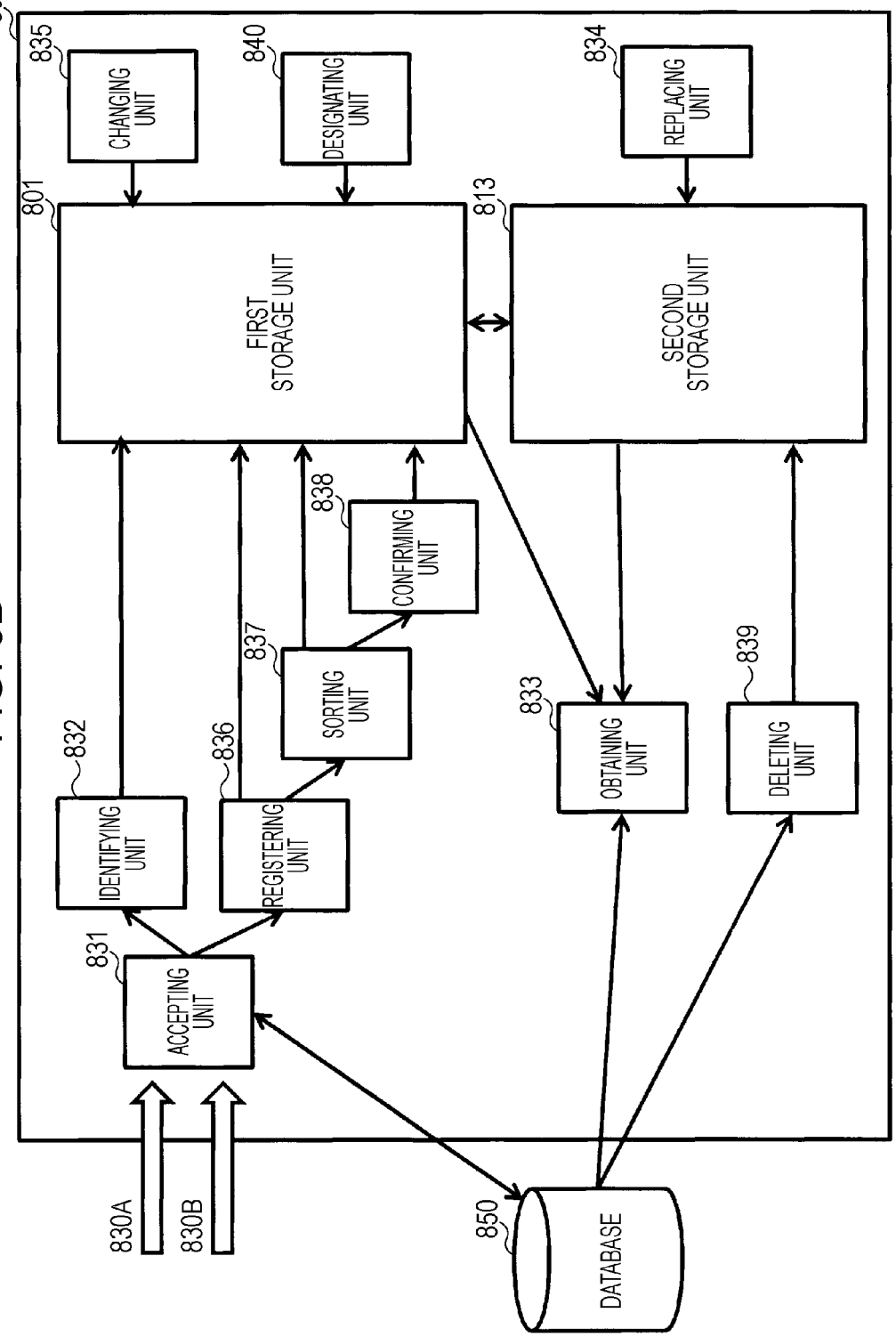
FIG. 8B is a functional block diagram illustrating functions of the application server of FIG. 2 according to the embodiment of the present invention.

FIG. 8B is a functional block diagram illustrating functions of the application server of FIG. 2 according to the embodiment of the present invention.

An accepting unit (831) accepts queries from the user or other computer systems. The accepting unit (831) accepts a retrieval transaction (830A) for retrieving the latest value at a designated time from a database (850). The accepting unit (831) also accepts an insertion transaction (830B) for inserting a value into the database (850). In the following description, an ID for data to be subjected to the retrieval transaction (830A) and the insertion transaction (830B) is 11. Therefore, the first time stamps A to D (806 to 808 and 818 of FIG. 8A) and the values A to D (809 to 811 and 821 of FIG. 8A) included in the data structures (803 and 815 of FIG. 8A) for ID=11 are used in the following description.

An identifying unit (832) identifies a time stamp corresponding to the latest value at a designated time. The identifying unit (832) identifies, in the first storage unit (801), a first time stamp (first largest-time-stamp) having the largest time stamp not exceeding a second time stamp that is included in the retrieval transaction (830A) and indicates the time of retrieval.

An obtaining unit (833) obtains a time stamp and a value belonging to the time stamp from at least one of the first storage unit (801), the second storage unit (813), and the database (850). If the first largest-time-stamp is the same as the pointed-to first time stamp (807 or 815 of FIG. 8A), the obtaining unit (833) obtains the value (821 of FIG. 8A) belonging to the first time stamp (807 or 815 of FIG. 8A) from the second storage unit (813). If the first largest-time-stamp is newer than the pointed-to first time stamp (807 or 815 of FIG. 8A), the obtaining unit (833) obtains a value belonging to the first largest-time-stamp from the first storage unit (801). When the second time stamp is older than the pointed-to first time stamp (818 of FIG. 8A) stored in the second storage unit (813) and belonging to the ID to be retrieved, the obtaining unit (833) obtains a value belonging to the largest time stamp not exceeding the second time stamp from each of the first storage unit (801) and the database (850). Then, of the values obtained, a value belonging to a time stamp indicating a newer time is determined to be a value obtained by the obtaining unit (833).

A replacing unit (834) replaces the pointed-to first time stamp (818 of FIG. 8A) belonging to the ID to be retrieved and the value (821 of FIG. 8A) belonging to the first time stamp (818), the first time stamp (818) and the value (821) being stored in the second storage unit (813), with the newest time stamp at a designated time and a value belonging to the newest time stamp, respectively.

A changing unit (835) changes the pointed-to first time stamp (807 of FIG. 8A) to the newest time stamp not exceeding a designated time or current time.

A registering unit (836) registers time stamps and values belonging to the time stamps included in the retrieval transaction (830A), the insertion transaction (830B), or the database (850) in the first storage unit (801) or the second storage unit (813).

Sorting unit (837) sorts, in response to registration of time stamps and values belonging to the time stamps in the first storage unit (801), the time stamps included in a list in descending or ascending order.

A confirming unit (838) commits a transaction in response to completion of the sorting.

A deleting unit (839) deletes first time stamps and values belonging to the first time stamps from the first storage unit (801) in response to execution of a deferred update on the database (850), the first time stamps indicating times older than that indicated by the pointed-to first time stamp.

A designating unit (840) designates one of the first time stamps (806 to 808 of FIG. 8A) with the pointer (812).

The database (850) is a database including "ID", "value", and "time stamp" as column items. If the retrieval transaction (830A) is issued and the latest value at a designated time is not included in the first storage unit (801), a value and a time stamp corresponding to the value are obtained from the database (850). If the insertion transaction (830B) is issued and there is no list for an ID corresponding to a value to be inserted into the first storage unit (801), a value and a time stamp corresponding to the value are obtained from the database (850). In response to execution of a deferred update, a time stamp older than the pointed-to time stamp (807 of FIG. 8A) and a value belonging to the older time stamp are registered in the database (850). The database (850) and a computer system (860) may be provided on different systems.

FIG. 9 is a block diagram illustrating hardware of the application server of FIG. 2 according to the embodiment of the present invention.

A computer system (901) includes a CPU (902) and a main memory (903), which are connected to a bus (904). The CPU (902) is preferably based on 32-bit or 64-bit architecture. Example of the CPU (902) include: Intel's Xeon (trademark) series, Core (trademark) series, Atom (trademark) series, Pentium (trademark) series, and Celeron (trademark) series; and AMD's Phenom (trademark) series, Athlon (trademark) series, Turion (trademark) series, and Sempron (trademark) series. A display (906), such as an LCD monitor, is connected through a display controller (905) to the bus (904). For management of the computer system, the display (906) displays, through an appropriate graphical interface, information about the computer system connected to a network through a communication line and information about software programs running on the computer system. A hard disk or silicon disk (908) and a CD-ROM, DVD, or BD drive (909) are connected through an IDE or S-ATA controller (907) to the bus (904).

The hard disk or silicon disk (908) stores an operating system, a program that provides a Java (trademark) processing environment such as J2EE, and other programs and data in such a manner that they can be loaded to the main memory (903).

The CD-ROM, DVD, or BD drive (909) is used to additionally introduce programs to the hard disk or silicon disk (908) from a CD-ROM, a DVD-ROM, or a BD when necessary. A keyboard (911) and a mouse (912) are connected through a keyboard/mouse controller (910) to the bus (904).

A communication interface (914) is implemented, for example, according to the Ethernet (trademark) protocol. The communication interface (914) is connected through a communication controller (913) to the bus (904). The communication interface (914) physically connects the computer system to a communication line (915) and provides a network interface layer for the TCP/IP communication protocol of the communication function of the operating system of the computer system. The communication line may be a wired LAN environment or a wireless LAN environment based on a wireless LAN connection standard, such as IEEE 802.11a/b/g/n.

Although the preferred embodiment of the present invention has been described in detail, it should be understood that various changes, substitutions and alternations can be made therein without departing from spirit and scope of the inventions as defined by the appended claims.

What is claimed is:

1. A computer system for making an inquiry about the latest value at a designated time using a database in which values and information on times associated with the individual values are contained in a table, the computer system comprising:
    a first storage unit that stores a first data structure, wherein said first data structure comprises, for each ID associated with the values in the database, (i) at least a first time stamp that is sorted in chronological order; (ii) values belonging to the individual first time stamps; and (iii) a pointer that designates one of the first time stamps, the first time stamps indicating the times when the values become valid;
    a second storage unit that stores a second data structure, wherein said second data structure comprises, for each ID, (i) the designated first time stamp; and (ii) a value belonging to the designated first time stamp;
    an accepting unit that accepts an inquiry for retrieving the latest value at a designated time from the database, the inquiry including a description for identifying at least one ID and a second time stamp indicating a time of retrieval;
    an identifying unit that identifies, from among first time stamps stored in the first storage unit and belonging to the identified ID, a first time stamp having the largest time stamp not exceeding the second time stamp (the first time stamp being hereinafter referred to as a first largest-time-stamp); and
    an obtaining unit that obtains, from the second storage unit, a value belonging to the identified ID when the designated first time stamp belonging to the identified ID is the same as the first largest-time-stamp, wherein when the second time stamp is older than the designated first time stamp stored in the second storage unit and belonging to the identified ID, the obtaining unit obtains, from the database, the largest time stamp belonging to the identified ID and not exceeding the second time stamp (the largest time stamp being hereinafter referred to as a second largest-time-stamp) and a value belonging to the second largest-time-stamp; and when the first largest-time-stamp is newer than the obtained second largest-time-stamp, the obtaining unit obtains a value belonging to the first largest-time-stamp from the first storage unit.

2. The computer system according to claim 1, wherein the obtaining unit obtains, from the first storage unit, a value belonging to the first largest-time-stamp when the designated first time stamp belonging to the identified ID is older than the first largest-time-stamp.

3. The computer system according to claim 2, further comprising a replacing unit that replaces the designated first time stamp belonging to the identified ID and the value belonging to the designated first time stamp, the designated first time stamp and the value being stored in the second storage unit, with the first largest-time-stamp and the value belonging to the first largest-time-stamp, respectively.

4. The computer system according to claim 2, further comprising a changing unit that changes a time stamp designated by the pointer from the designated first time stamp belonging to the identified ID to the first largest-time-stamp.

5. The computer system according to claim 2, wherein, the obtaining unit obtains a value belonging to the largest time stamp not exceeding the second time stamp by searching the database when no value belonging to an ID to be retrieved is present in the second storage unit.

6. The computer system according to claim 1, wherein the accepting unit accepts a transaction for inserting a value into the database,
    the computer system further comprising a registering unit that registers, in the first storage unit, a value to be inserted and a third time stamp indicating a time when the value to be inserted becomes valid, the value and the third time stamp being included in the transaction.

7. The computer system according to claim 6, further comprising a sorting unit that sorts first time stamps belonging to an ID corresponding to the value to be inserted, in response to the registration and in chronological order.

8. The computer system according to claim 7, further comprising a confirming unit that commits the transaction upon completion of the sorting.

9. The computer system according to claim 6, wherein when no first time stamp belonging to an ID corresponding to the value to be inserted is present in the first storage unit,
    the obtaining unit searches the database to further obtain (i) the largest time stamp belonging to the ID corresponding to the value to be inserted and not exceeding the third time stamp, (ii) a value belonging to the largest time stamp, (iii) a time stamp belonging to the ID corresponding to the value to be inserted and newer than the third time stamp, and (iv) a value belonging to the time stamp; and
    the registering unit further registers, in the first storage unit, (i) the obtained largest time stamp, (ii) the value belonging to the largest time stamp, (iii) the obtained newer time stamp, and (iv) the value belonging to the newer time stamp,
    the computer system further comprising a sorting unit that sorts the registered largest time stamp and the registered newer time stamp in chronological order.

10. The computer system according to claim 9, further comprising a designating unit that designates the registered largest time stamp with the pointer,
    wherein the registering unit further registers, in the second storage unit, the registered largest time stamp and the value belonging to the registered largest time stamp.

11. The computer system according to claim 1, further comprising a deleting unit that deletes first time stamps indicating times older than the designated first time stamp and values belonging to the first time stamps from the first storage unit when a deferred update is executed on the database.

12. The computer system according to claim 1, further comprising a changing unit that periodically changes a time stamp designated by the pointer from the designated first time stamp to third largest-time-stamp which is the largest first time stamp not exceeding the current time.

13. The computer system according to claim 12, further comprising a replacing unit that replaces, in response to the change by the changing unit, the designated first time stamp and a value belonging to the designated first time stamp stored in the second storage unit with the third largest-time-stamp and a value belonging to the third largest-time-stamp, respectively.

14. The computer system according to claim 1, wherein the database is an insert-only database.

15. A method for making an inquiry about the latest value at a designated time using a database in which values and information on times associated with the individual values are contained in a table, the method comprising the steps of:

storing a first data structure in a first storage unit, wherein the first data structure comprises, for each ID associated with the values in the database, (i) at least a first time stamp that is sorted in chronological order; (ii) values belonging to the individual first time stamps; and (iii) a pointer that designates one of the first time stamps, the first time stamps indicating the times when the values become valid;

storing a second data structure in a second storage unit, wherein said second data structure comprises, for each ID, (i) the designated first time stamp; and (ii) a value belonging to the designated first time stamp;

accepting an inquiry for retrieving the latest value at a designated time from the database, the inquiry including a description for identifying at least one ID and a second time stamp indicating a time of retrieval;

identifying, from among first time stamps stored in the first storage unit and belonging to the identified ID, a first largest-time-stamp, said first largest-time-stamp having the largest time stamp not exceeding the second time stamp; and obtaining, from the second storage unit, a value belonging to the identified ID when the designated first time stamp belonging to the identified ID is the same as the first largest-time-stamp, wherein when the second time stamp is older than the designated first time stamp stored in the second storage unit and belonging to the identified ID, the obtaining unit obtains, from the database, the largest time stamp belonging to the identified ID and not exceeding the second time stamp (the largest time stamp being hereinafter referred to as a second largest-time-stamp) and a value belonging to the second largest-time-stamp; and when the first largest-time-stamp is newer than the obtained second largest-time-stamp, the obtaining unit obtains a value belonging to the first largest-time-stamp from the first storage unit.

16. A non-transitory computer program product comprising a storage medium having computer-executable program instructions tangibly embodied therein or thereon that, when executed by a computer, cause the computer to execute each step of the method according to claim 15.

* * * * *